US012784659B2

(12) United States Patent
Lee et al.

(10) Patent No.: US 12,784,659 B2
(45) Date of Patent: Nov. 3, 2026

(54) DISPLAY DEVICE, ELECTRONIC DEVICE INCLUDING THE SAME, AND DRIVING METHOD THEREOF

(71) Applicant: Samsung Display Co., Ltd., Yongin-si (KR)

(72) Inventors: Ye Ji Lee, Yongin-si (KR); Hyo Min Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/084,549

(22) Filed: Mar. 19, 2025

(65) Prior Publication Data

US 2025/0391328 A1 Dec. 25, 2025

(30) Foreign Application Priority Data

Jun. 24, 2024 (KR) ........................ 10-2024-0081964

(51) Int. Cl.
*G09G 3/32* (2016.01)

(52) U.S. Cl.
CPC ........... *G09G 3/32* (2013.01); *G09G 2360/14* (2013.01)

(58) Field of Classification Search
CPC .............................. G09G 3/32; G09G 2360/14
See application file for complete search history.

(56) References Cited

U.S. PATENT DOCUMENTS

2016/0165700 A1* 6/2016 Takahashi ............. H05B 45/60 315/158
2021/0225272 A1* 7/2021 Yang .................... G09G 3/2092
2022/0190061 A1 6/2022 Baek et al.
2022/0366846 A1* 11/2022 Chang .................. G09G 3/3225
2024/0046878 A1* 2/2024 Chen .................... G09G 3/3258

FOREIGN PATENT DOCUMENTS

KR 10-0573134 B1 4/2006
KR 10-2022-0085929 A 6/2022

* cited by examiner

*Primary Examiner* — Muhammad N Edun
(74) *Attorney, Agent, or Firm* — Womble Bond Dickinson (US) LLP

(57) ABSTRACT

A display device includes: a display panel including pixels each including a light emitting element and optical sensors each including a light receiving element; a sensing circuit configured to sense the optical sensors; and a compensating circuit configured to store sensing correction data corresponding to a size of the light receiving element of each of the optical sensors, based on a result of sensing the optical sensors.

16 Claims, 12 Drawing Sheets

1100

<Lookup table>

| | Size | SC | SCD |
|---|---|---|---|
| LRD1 | 10 | SC1 | SCD1 |
| LRD2 | 9 | SC2 | SCD2 |
| LRD3 | 11 | SC3 | SCD3 |

LRD: LRD1, LRD2, LRD3

DISPLAY DEVICE, ELECTRONIC DEVICE INCLUDING THE SAME, AND DRIVING METHOD THEREOF

CROSS-REFERENCE TO RELATED APPLICATION

The present application claims priority to and the benefit of Korean Patent Application No. 10-2024-0081964, filed on Jun. 24, 2024, in the Korean Intellectual Property Office, the entire disclosure of which is incorporated herein by reference.

BACKGROUND

1. Field

Aspects of some embodiments of the present disclosure relate to a display device, an electronic device including the same, and a driving method thereof.

2. Description of the Related Art

As the information society develops, consumer demand for display devices for displaying images has increased in various forms. For example, display devices may be applied to various electronic devices such as smart phones, digital cameras, laptop computers, navigation units, and smart televisions.

A display device may include an optical sensor including light receiving elements on the display panel to detect fingerprints and/or illuminance, etc. Some systems may be required to precisely detect fingerprints and/or illuminance, etc., regardless of characteristics of the optical sensor.

The above information disclosed in this Background section is only for enhancement of understanding of the background and therefore the information discussed in this Background section does not necessarily constitute prior art.

SUMMARY

Aspects of some embodiments of the present disclosure may include a display device capable of sensing optical sensors of a display panel with relatively improved reliability, an electronic device including the same, and a driving method thereof.

Aspects of some embodiments of the present disclosure include a display device including a display panel including pixels each including a light emitting element and optical sensors each including a light receiving element, a sensing circuit configured to sense the optical sensors, and a compensating circuit storing sensing correction data corresponding to a size of the light receiving element of each of the optical sensors based on a result of sensing the optical sensors.

According to some embodiments, an intensity of current flowing through each of the optical sensors due to light incident on the display panel may be different from each other.

According to some embodiments, the optical sensors may include a first optical sensor and a second optical sensor different from the first optical sensor, and the compensating circuit may include a calculation unit that generates the sensing correction data based an intensity of current flowing through the first optical sensor and the second optical sensor.

According to some embodiments, the compensating circuit may include a data storage unit that stores the sensing correction data, and the sensing correction data may be inversely proportional to the size of the light receiving element.

According to some embodiments, the display panel may further include a bank layer including a first opening in an area corresponding to the light receiving element of each of the optical sensors; and a black matrix layer on the bank layer and including a second opening in an area corresponding to the light receiving element of each of the optical sensors.

According to some embodiments, the size of the light receiving element may be determined by a width of the first opening and the second opening.

According to some embodiments, the sensing correction data may be generated based on a difference between an intensity of current flowing in the first optical sensor and an intensity of the current flowing in the second optical sensor.

According to some embodiments, the optical sensors may further include a third optical sensor, and the sensing correction data may be generated by normalizing an intensity of current flowing through each of the first optical sensor, the second optical sensor, and the third optical sensor.

Aspects of some embodiments of the present disclosure include an electronic device including a display device including a display panel including optical sensors and a sensing circuit configured to sense the optical sensors; a compensating circuit that generates sensing correction data based on a result of sensing the optical sensors; and a processor that receives the sensing correction data from the compensating circuit and provides image data generated based on the sensing correction data to the display device, wherein each of the optical sensors includes a light receiving element, and the sensing correction data corresponds to a size of the light receiving element.

According to some embodiments, an intensity of current flowing through each of the optical sensors due to light incident on the display panel may be different from each other.

According to some embodiments, the compensating circuit may include a calculation unit that generates the sensing correction data based on an intensity of the current flowing through each of the optical sensors.

According to some embodiments, each of the processors may include a data storage unit that stores the sensing correction data, and the sensing correction data may be inversely proportional to the size of the light receiving element.

Aspects of some embodiments of the present disclosure include a driving method of an electronic device including sensing currents of optical sensors on a display panel using a sensing circuit; generating input sensing data based on a result of sensing the sensing currents of the optical sensors using the sensing circuit; receiving the input sensing data and generating sensing correction data corresponding to each of the optical sensors based on the received input sensing data using a compensating circuit; and generating output sensing data based on the sensing correction data and the input sensing data using a processor.

According to some embodiments, the optical sensors may include a first optical sensor and a second optical sensor different from the first optical sensor, and the input sensing data may be proportional to an intensity of the sensing current flowing through the first optical sensor and the second optical sensor.

According to some embodiments, the compensating circuit may generate the sensing correction data based on a difference in the intensity of the sensing current of the first optical sensor and the sensing current of the second optical sensor.

According to some embodiments, the optical sensors may further include a third optical sensor, and the sensing correction data may be generated by normalizing the input sensing data of the first optical sensor, the second optical sensor, and the third optical sensor.

According to some embodiments, the driving method may further include storing the sensing correction data corresponding to each of the first optical sensor and the second optical sensor, wherein the output sensing data may be generated by reflecting the sensing correction data stored in the intensity of current flowing through the first optical sensor and the second optical sensor.

In a display device, an electronic device including the same, and a driving method thereof according to some embodiments of the present disclosure, the electronic device can sense the optical sensors of the display panel with relatively improved reliability.

Aspects of some embodiments are not limited by the characteristics described above, and more various other characteristics are included in the present specification.

DETAILED DESCRIPTION

Figure 1:
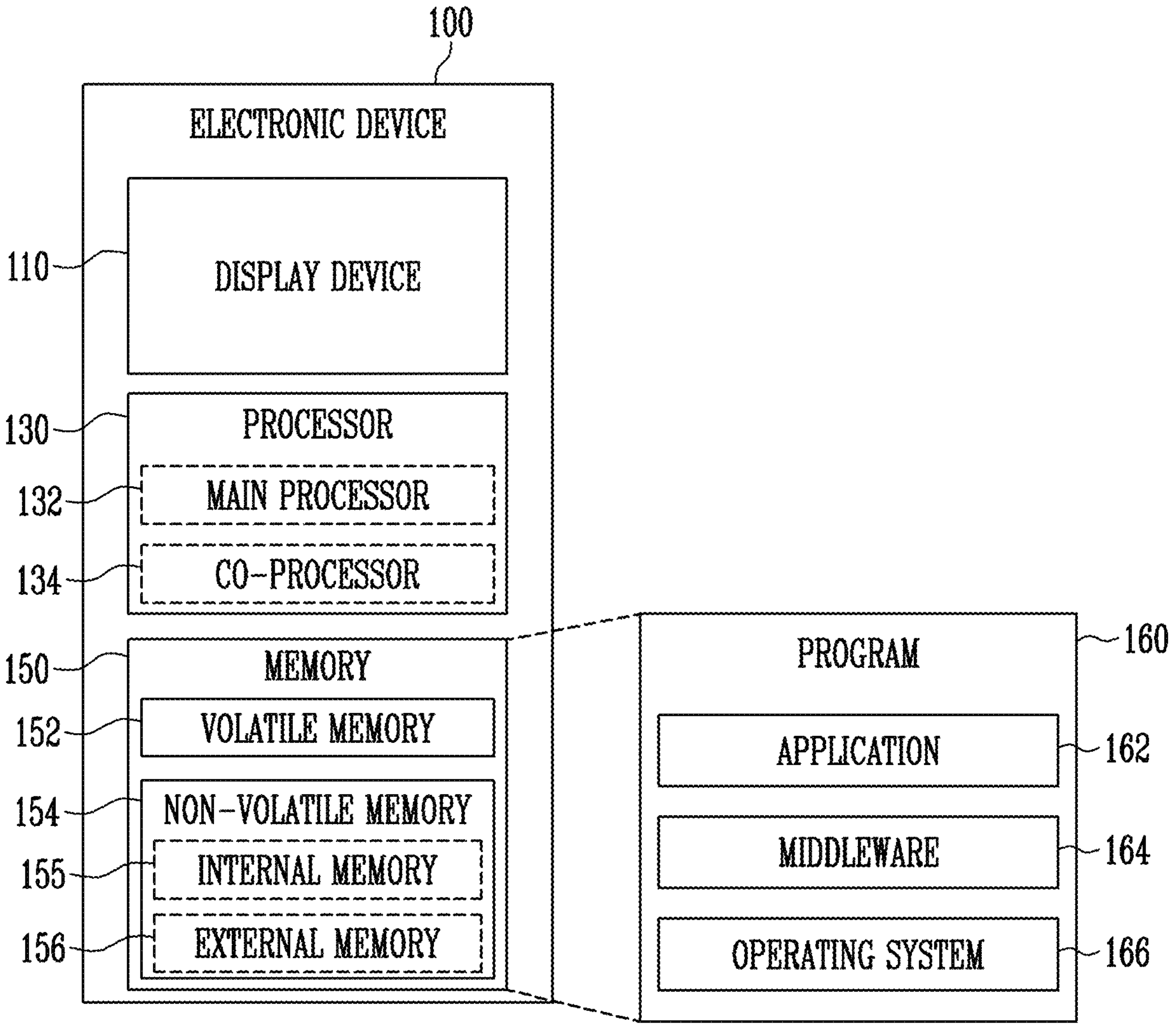
FIG. 1 is a schematic system diagram of an electronic device according to some embodiments of the present disclosure.

Hereinafter, aspects of some embodiments of the present disclosure will be described in more detail with reference to the attached drawings. It should be noted that only the parts necessary to understand the operation according to the present invention will be described in the following description, and the description of other parts will be omitted to not obscure the gist of the present invention. Additionally, embodiments according to the present invention are not limited to the embodiments described herein and may be embodied in other forms. However, the embodiments described herein are provided to explain in detail enough to enable those skilled in the art to easily implement the technical idea of the present invention.

Throughout the specification, when a part is said to be "connected" to another part, this includes not only the case where it is "directly connected" but also the case where it is "indirectly connected" with another element therebetween. The term used in this specification is for the purpose of describing the embodiments and is not intended to limit the present invention. In this disclosure below, when it is described that one "includes" some elements, it should be understood that it may include only those elements, or it may include other elements as well as those elements if there is no specific limitation. "at least one of X, Y, and Z", and "at least one selected from the group consisting of X, Y, and Z" may be interpreted as an X, a Y, a Z, or any combination (e.g., XYZ, XYY, YZ, and ZZ) of two or more among X, Y, and Z. Here, "and/or" includes any combination of one or more of the constituents.

Here, terms such as first, second, etc. may be used to describe various components, but these components are not limited to these terms. These terms are used only to distinguish one constituent element from another constituent element. Accordingly, the first component may be referred to as the second component within the scope of what is disclosed herein.

Spatially relative terms such as "below," "above," etc. may be used for descriptive purposes, thereby describing the relationship of one element or feature to another element(s) or feature(s) as shown in the drawings. do. Spatially relative terms are intended to include different directions in use, operation, and/or manufacture in addition to the directions depicted in the drawings. For example, if the device shown in the drawings is turned over, elements depicted as being located "below" other elements or features may be located "above" the other elements or features. Accordingly, in the present disclosure, the term "below" may include both above and below directions. Additionally, the device may be oriented in other directions (e.g., rotated by 90 degrees or in other orientations), and thus the spatially relative terms used herein should be interpreted accordingly.

Various embodiments are described with reference to drawings that schematize ideal embodiments. Accordingly, it will be expected that the shapes may vary depending, for example, on tolerances and/or manufacturing techniques. Accordingly, embodiments disclosed herein should not be construed as being limited to the specific shapes shown, and should be construed to include changes in shapes that occur, for example, as a result of manufacturing. As such, the shapes shown in the drawings may not depict the actual shapes of areas of the device, and the present embodiments are not limited thereto.

FIG. 1 is a schematic system diagram of an electronic device according to some embodiments of the present disclosure. Although FIG. 1 illustrates various components in an electronic device according to some embodiments, embodiments according to the present disclosure are not limited thereto, and according to various embodiments, the electronic device may include additional components or fewer components without departing from the spirit and scope of embodiments according to the present disclosure.

Referring to FIG. 1, the electronic device 100 according to some embodiments of the present disclosure may include a display device 110, a processor 130, and a memory 150.

The display device 110 may visually provide information to the outside (e.g., a user) of the electronic device 100. The display device 110 may include, for example, a display panel, a driving circuit, etc. The display device 110 according to some embodiments of the present disclosure may include a touch sensor configured to detect a touch and/or a pressure sensor configured to measure the intensity of force generated by the touch.

The processor 130 may, for example, execute software (e.g., program 160) to control at least one other component (e.g., hardware or software component) of the electronic device 100 connected to the processor 130, and may perform various data processing or calculation. According to some embodiments of the present disclosure, as at least a portion of data processing or calculation, the processor 130 may store data received from another component (e.g., the display device 110) in the volatile memory 152, and may process commands or data stored in the volatile memory 152 to store the resulting data in the non-volatile memory 154. According to some embodiments of the present disclosure, the processor 130 may include a main processor 132 (e.g., a central processing unit or an application processor) or an auxiliary processor 134 (e.g., a graphics processing unit (GPU), a neural network processing unit (NPU), an image signal processor, a sensor hub processor, a communication processor, etc) that can operate independently or together with the main processor 132. For example, when the electronic device 100 includes the main processor 132 and the secondary processor 134, the secondary processor 134 may be set to use lower power than the main processor 132 or be specialized for a designated function. The auxiliary processor 134 may be implemented separately from the main processor 132 or as a portion thereof.

The auxiliary processor 134 may, for example, control at least some of functions or states related to at least one (e.g., the display device 110) of the components of the electronic device 100, on behalf of the main processor 132 while the main processor 132 is in an inactive (e.g., sleep) state, or together with the main processor 132 while the main processor 132 is in an active (e.g., application execution) state. According to some embodiments of the present disclosure, the auxiliary processor 134 (e.g., an image signal processor or a communication processor) may be implemented as a part of other functionally related components (e.g., a camera module, a communication module, etc.). According to some embodiments of the present disclosure, the auxiliary processor 134 (e.g., neural network processing device) may include a hardware structure specialized for processing artificial intelligence models. The artificial intelligence models may be created through machine learning.

The memory 150 may store various data used by at least one component (e.g., processor 130) of the electronic device 100. Data may include, for example, input data or output data for software (e.g., program 160) and commands associated therewith. The memory 150 may include a volatile memory 152 or a non-volatile memory 154. The non-volatile memory 154 may include embedded memory 155. The non-volatile memory 154 may further include an external memory 156.

The program 160 may be stored as software in the memory 150 and may include, for example, an application 162, a middleware 164, and an operating system 166.

The electronic device 100 according to some embodiments of the present disclosure may be referred to as a mobile station, a mobile equipment (ME), a user equipment (UE), a user terminal (UT), a subscriber station (SS), a wireless device, a handheld device, access terminal (AT), and the like. The electronic device 100 according to some embodiments of the present disclosure may be a device with a communication function, such as a mobile phone, a personal digital assistant (PDA), a smart phone, a wireless MODEM, or a notebook.

The electronic device 100 according to some embodiments of the present disclosure may include a power management module configured to manage power supplied to the electronic device 100. For example, the power management module may be implemented as at least a portion of a power management integrated circuit (PMIC).

At least some of components of the electronic device 100 according to some embodiments of the present disclosure may be connected to each other through a communication method between peripheral devices (e.g., bus, general purpose input and output (GPIO), serial peripheral interface (SPI), or mobile industry processor interface (MIPI), etc.) and may exchange signals (e.g., commands or data) with each other.

Figure 2A:
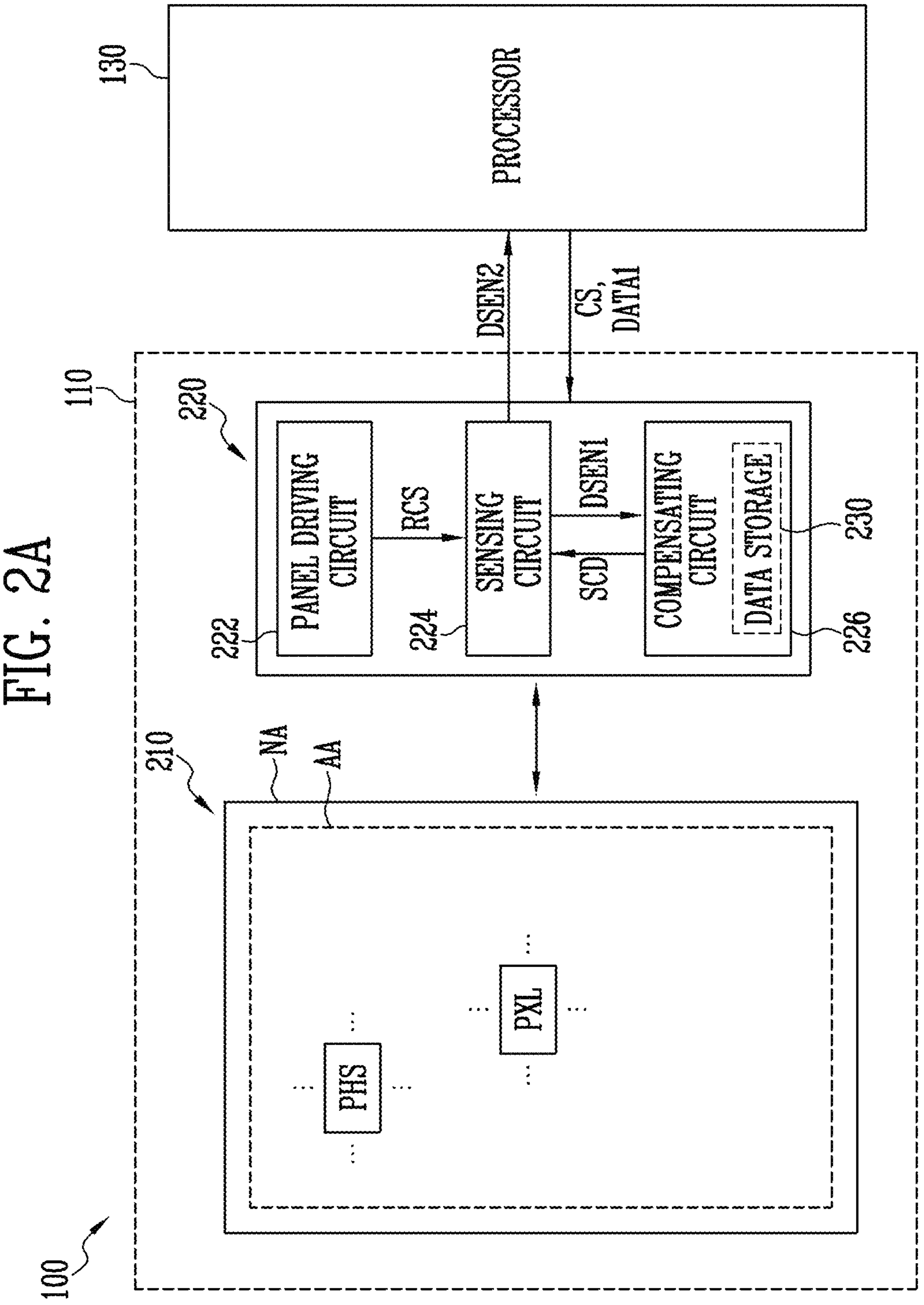
FIG. 2A is a drawing illustrating a display device and a processor according to some embodiments of the present disclosure.

FIG. 2A is a drawing illustrating a display device and a processor according to some embodiments of the present disclosure.

Referring to FIG. 2A, the electronic device 100 according to some embodiments of the present disclosure may include a display device 110 and a processor 130. At this time, the display device 110 may include a display panel 210 and a driving circuit 220.

The display panel 210 may include a display area AA where pixels PXL are located and a non-display area NA located in a peripheral area (e.g., an edge area, an area surrounding the display area AA, and/or an area outside a footprint of the display area AA) of the display area AA. One or more pixels (also referred to as pixels) PXL may be located in the display area AA. One or more optical sensors PHS may be located in the display area AA.

The pixels PXL may be configured to display images on the display device 110. The pixels PXL may emit light with brightness corresponding to a voltage (e.g., data voltage) input from the driving circuit 220.

The optical sensors PHS may be configured to detect the amount of light received. The optical sensors PHS may include a light receiving element. Depending on the intensity of light incident on the optical sensors PHS, the intensity of the current flowing through the optical sensors PHS (or flowing through the light receiving element) may vary. Light incident on the optical sensors PHS may include reflected light. Here, the reflected light is light emitted from the display device 110 and reflected by an external object (e.g., a surface of a human finger, a wall of a human blood vessel, a human bone, etc.). For example, the intensity of current flowing through the optical sensors PHS may vary depending on the intensity of reflected light (or amount of the reflected light).

One or more pins (e.g., pads) may be located in the non-display area NA. At least some components of the display panel 210 and the driving circuit 220 may be electrically connected to each other through pins.

The driving circuit 220 may include a panel driving circuit 222, a sensing circuit 224, and a compensating circuit 226.

The panel driving circuit 222 may generate a signal that supplies voltage to the display panel 210. For example, the driving circuit 220 may include a data driving circuit configured to output a data voltage, a scan driving circuit configured to supply a scan signal, an emission driving circuit configured to supply an emission control signal, etc. there is. For example, the driving circuit 220 may include a timing controller configured to control an operation timing of the data driving circuit, the scan driving circuit, and the emission driving circuit.

The panel driving circuit 222 may output a read-out circuit control signal RCS. The sensing circuit 224 may receive a read-out circuit control signal RCS. The timing (or length of period) at which the sensing circuit 224 senses (e.g., reads out) the optical sensors PHS may be controlled by the read-out circuit control signal RCS.

The sensing circuit 224 may be configured to sense optical sensors PHS. For example, the sensing circuit 224 may convert values sensed by the optical sensors PHS into corresponding digital values. According to some embodiments, the sensing circuit 224 may include an analog-to-digital converter configured to convert an analog voltage value into a corresponding digital value. The sensing circuit 224 may output the converted digital value.

The sensing circuit 224 may generate input sensing data DSEN1. For example, a plurality of optical sensors PHS may be located on the display area AA. The sensing circuit 224 may generate the input sensing data DSEN1 by measuring the intensity of a current flowing through each of the plurality of optical sensors PHS with respect to light incident on the plurality of optical sensors PHS. That is, the input sensing data DSEN1 may be data regarding the degree to which each of the plurality of optical sensors PHS responds to light of the same intensity incident on the display device 110. At this time, the sensing circuit 224 may output the input sensing data DSEN1 to the compensating circuit 226.

The compensating circuit 226 may receive first input sensing data DSEN1. The compensating circuit 226 may generate sensing correction data SCD based on the received first input sensing data DSEN1. For example, the compensating circuit 226 may generate sensing correction data SCD corresponding to each of the optical sensors PHS.

The compensating circuit 226 may include a data storage unit 230 that stores sensing correction data SCD. The data storage unit 230 may store sensing correction data SCD generated by the compensating circuit 226. Thereafter, the compensating circuit 226 may transmit the sensing correction data SCD stored in the data storage unit 230 to the sensing circuit 224.

According to some embodiments, the data storage unit 230 may include non-volatile memory devices such as a flash memory, a phase change random access memory (PRAM), resistance random access memory (RRAM), a magnetic random access memory (MRAM), and a ferroelectric random access memory (FRAM), etc., but are not limited thereto.

The sensing circuit 224 may receive sensing correction data SCD from the compensating circuit 226. The sensing circuit 224 may generate output sensing data DSEN2. For example, the sensing circuit 224 may generate output sensing data DSEN2 that reflects the sensing correction data SCD in the input sensing data DSEN1. The sensing circuit 224 may provide output sensing data DSEN2 to the processor 130.

The processor 130 may provide the driving circuit 220 with first image data DATA1 generated based on the output sensing data DSEN2. For example, the processor 130 may generate an image based on the output sensing data DSEN2.

Meanwhile, the processor 130 may output a control signal CS to control the operation timing of the driving circuit 220. Accordingly, the driving circuit 220 may receive the control signal CS and the first image data DATA1 and display images through the pixels PXL of the display panel 210.

Figure 2B:
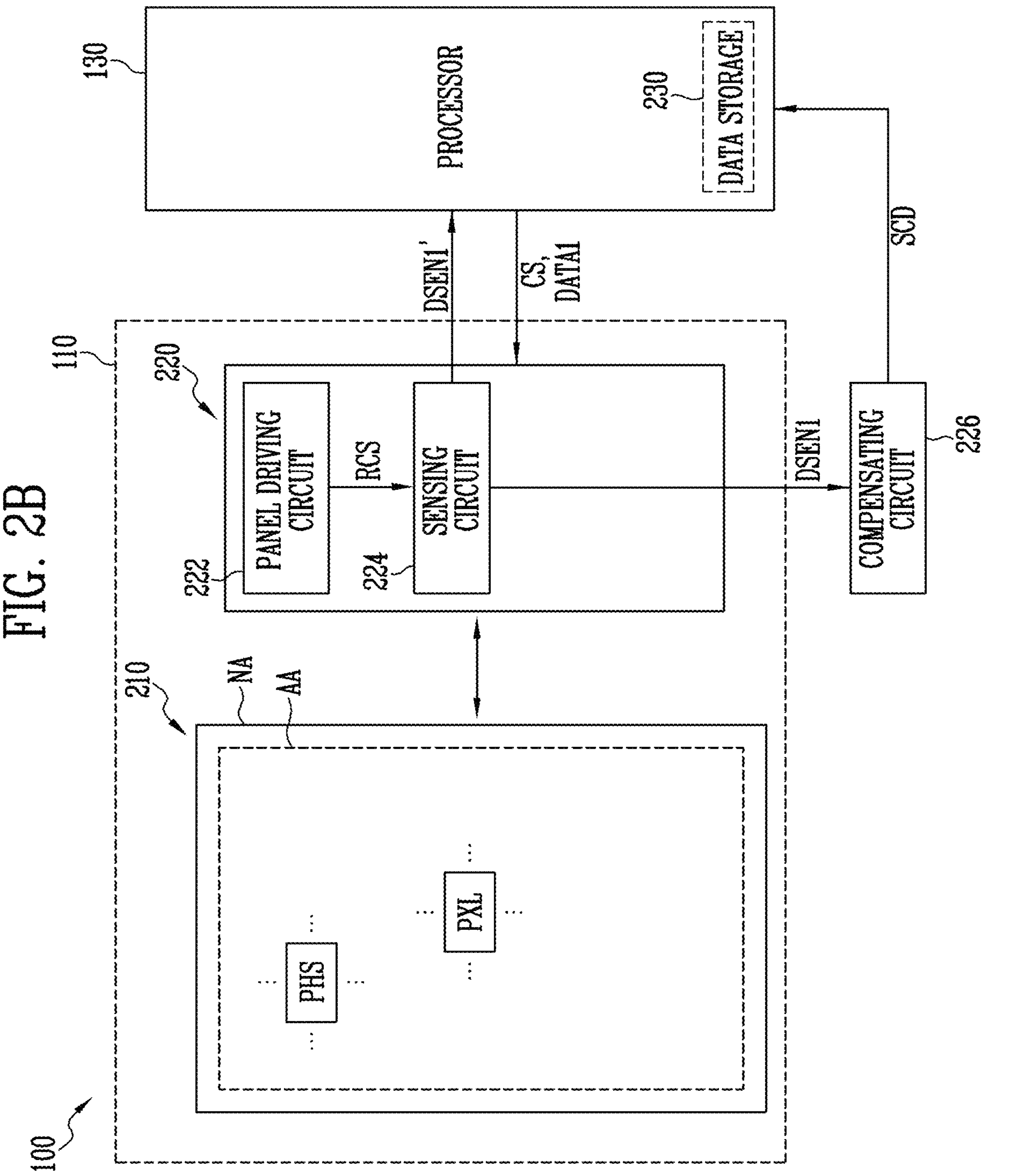
FIG. 2B is a drawing illustrating a display device and a processor according to some embodiments of the present disclosure.

FIG. 2B is a drawing illustrating a display device and a processor according to other embodiments of the present disclosure.

Referring to FIG. 2B, the electronic device 100 according to other embodiments of the present disclosure may include a display device 110, a compensating circuit 226, and a processor 130. The electronic device 100 of FIG. 2B may be described similarly to the electronic device 100 of FIG. 2A, and some overlapping descriptions may be omitted below.

The sensing circuit 224 may measure the intensity of the current flowing through each of the optical sensors PHS located on the display area AA to generate the first input sensing data DSEN1 and the second input sensing data DSEN1'. The sensing circuit 224 may provide the first input sensing data DSEN1 to the compensating circuit 226 and provide the second input sensing data DSEN1' to the processor 130. At this time, the first input sensing data DSEN1 and the second input sensing data DSEN1' may be substantially the same data. Additionally, the first input sensing data DSEN1 and the second input sensing data DSEN1' of FIG. 2B may be described similarly to the input sensing data DSEN1 of FIG. 2A. For example, the first input sensing data DSEN1 and the second input sensing data DSEN1' of FIG. 2B May be data in which the sensing correction data SCD output from the compensating circuit 226 is not reflected.

Referring to FIG. 2B, the compensating circuit 226 may be located outside the display device 110. According to some embodiments, the compensating circuit 226 may be included in the electronic device 100 (see FIG. 1), but may be configured as an integrated circuit separate from the panel driving circuit 220 and located outside the display device 110.

According to some embodiments, the compensating circuit 226 may be configured as a separate device from the electronic device 100 and may be located outside the electronic device 100. For example, the compensating circuit 226 may be connected to the display device 110 and the processor 130 through a communication mechanism or method (e.g., a set or predetermined communication mechanism or method) (wired and/or wireless communication method) with the electronic device 100 outside the electronic device 100.

The compensating circuit 226 may generate sensing compensation data SCD based on the first input sensing data DSEN1. The compensating circuit 226 may provide the generated sensing correction data SCD to the processor 130. That is, the processor 130 may receive sensing correction data SCD from the compensating circuit 226 located outside the display device 110.

The processor 130 may include a data storage unit 230. The data storage unit 230 may store the received sensing correction data SCD. Accordingly, the processor 130 may reflect the sensing correction data SCD in the second input sensing data DSEN1' to generate the above-described output sensing data DSEN2 (see FIG. 2A) or data corresponding thereto.

For convenience of description, the electronic device 100 according to the above-described embodiments will be described below with reference to FIG. 2A.

Figure 3:
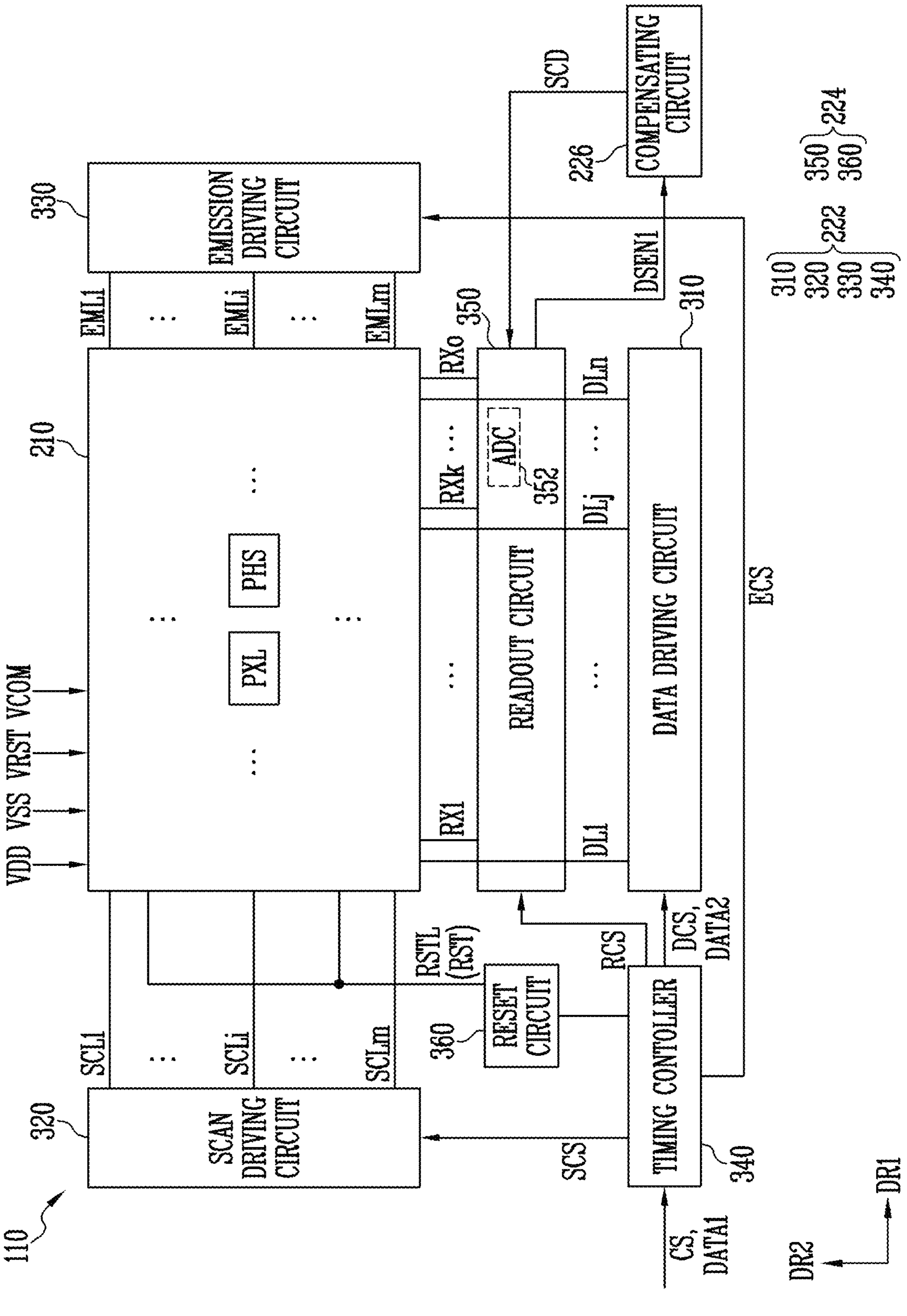
FIG. 3 is a system diagram of a display device according to some embodiments of the present disclosure.

FIG. 3 is a system diagram of a display device according to some embodiments of the present disclosure.

Thereinafter, for convenience of description, a system diagram of the display device 110 included in the electronic device 100 described above is shown as an example through FIGS. 1 and 2A. However, embodiments of the present disclosure are not limited thereto.

Referring to FIG. 3, a display device according to some embodiments of the present disclosure includes a display panel 210, a compensating circuit 226, a data driving circuit 310, a scan driving circuit 320, a emission driving circuit 330, a timing controller 340, a read-out circuit 350, or a reset circuit 360, etc.

The above-described panel driving circuit 222 may include a data driving circuit 310, a scan driving circuit 320, a emission driving circuit 330, and a timing controller 340. The above-described sensing circuit 224 may include a read-out circuit 350 and a reset circuit 360.

One or more pixels PXL may be located on the display panel 210. One or more optical sensors PHS may be located on the display panel 210. One or more power voltages may be supplied to the display panel 210.

The power voltage may include, for example, a first power voltage VDD, a second power voltage VSS, a third power voltage VRST, and a fourth power voltage VCOM. The power voltage may be commonly input to a plurality of pixels PXL and/or a plurality of optical sensors PHS, and may be also called a common voltage. The power voltage may be generated, for example, in a power management module.

A plurality of data lines DL1 to DLn (n is an integer of 2 or more) may be located on the display panel 210. The plurality of data lines DL1 to DLn may be arranged to extend in the second direction DR2 on the display panel 210. For example, the second direction DR2 may be a direction connecting upper and lower sides of the display panel 210 (e.g., a column direction), or a direction connecting left and right sides of the display panel 210 (e.g., a row direction). Thereinafter, for convenience of description, the second direction DR2 is described as a direction connecting the upper and lower sides of the display panel 210 as an example, but embodiments according to the present disclosure are not limited thereto.

A plurality of scan lines SCL1 to SCLm (m is an integer of 2 or more) may be located on the display panel 210. A plurality of scan lines SCL1 to SCLm may be arranged to extend in the first direction DR1 on the display panel 210. For example, the first direction DR1 may be a direction connecting the left and right sides of the display panel 210, or may be a direction connecting the upper and lower sides of the display panel 210. For example, the first direction DR1 may be perpendicular to the second direction DR2. Thereinafter, for convenience of description, the first direction DR1 is described as a direction connecting the left and right sides of the display panel 210 as an example, but embodiments according to the present disclosure are not limited thereto.

Meanwhile, being arranged to extend in the second direction DR2 may mean that it is arranged to extend in a direction connecting the upper and lower sides, entirely and it never exclude extending in a direction different from the first direction DR1, partially. For example, according to some embodiments of the present disclosure, at least one data line among the plurality of data lines DL1 to DLn may be partially designed to detour and extend in a different direction from the second direction DR2 to avoid a specific area (e.g., an area where the transmittance is set to be high). The meaning of being arranged to extend in the first direction DR1 may also be understood to have the same as the meaning of being arranged to extend in the second direction DR2.

A plurality of emission control lines EML1 to EMLm may be located on the display panel 210. The plurality of emission control lines EML1 to EMLm may be arranged to extend from the display panel 210 in the second direction DR2.

A plurality of sensing lines RX1 to RXo (where o is an integer of 2 or more) may be located on the display panel 210. The plurality of sensing lines RX1 to RXo may be arranged to extend in the first direction DR1 on the display panel 210.

One or more reset control lines RSTL may be located on the display panel 210.

The pixels PXL may be electrically connected to any one of the plurality of data lines DL1 to DLn. The pixels PXL may be electrically connected to at least one scan line among the plurality of scan lines SCL1 to SCLm. The pixels PXL may be electrically connected to at least one emission control line among the plurality of emission control lines EML1 to EMLm.

The optical sensors PHS may be electrically connected to any one of the plurality of sensing lines RX1 to RXo. According to some embodiments, the optical sensors PHS may be electrically connected to the reset control line RSTL. According to some embodiments, the optical sensors PHS may be electrically connected to at least one scan line among the plurality of scan lines SCL1 to SCLm. According to some embodiments, the optical sensors PHS may be electrically connected to at least one emission control line among the plurality of emission control lines EML1 to EMLm.

The pixels PXL and the optical sensors PHS may be electrically connected to one of the plurality of scan lines SCL1 to SCLm. The pixels PXL and the optical sensors PHS may be electrically connected to one of the plurality of emission control lines EML1 to EMLm.

According to some embodiments, the plurality of pixels PXL may be arranged in a matrix type on the display panel 210. Within the matrix type, a plurality of pixels PXL may be located in an RGBG type or in a diamond-shaped PENTILE™ structure. However, embodiments according to the present disclosure are not limited thereto.

The data driving circuit 310 may be configured to supply (apply or output) a data voltage to the plurality of data lines DL1 to DLn. The data driving circuit 310 may receive the data driving circuit control signal DCS and the second image data DATA2 and may supply a data voltage corresponding to the image data to the plurality of data lines DL1 to DLn in accordance with the timing.

The scan driving circuit 320 may be configured to supply scan signals to a plurality of scan lines SCL1 to SCLm. According to some embodiments, the scan driving circuit 320 may be configured to sequentially supply scan signals to a plurality of scan lines SCL1 to SCLm, but is not limited thereto. The scan driving circuit 320 may receive a scan driving circuit control signal SCS and supply the scan signal to the plurality of scan lines SCL1 to SCLm with accordance with the timing.

The emission driving circuit 330 may be configured to supply an emission control signal to a plurality of emission control lines EML1 to EMLm. According to some embodiments, the emission driving circuit 330 may be configured to sequentially supply emission control signals to a plurality of emission control lines EML1 to EMLm, but is not limited thereto. The emission driving circuit 330 may receive an emission driving circuit control signal ECS and may supply the emission control signal to the plurality of emission control lines EML1 to EMLm in accordance with the timing.

The timing controller 340 may receive a control signal CS and first image data DATA1 from the outside, and may generate and output a data driving circuit control signal DCS, a scan driving circuit control signal SCS, an emission driving circuit control signal ECS, second image data DATA2, a read-out circuit control signal RCS, etc. based on the input control signal CS and the first image data DATA1.

The read-out circuit 350 may be electrically connected to a plurality of sensing lines RX1 to RXo. The read-out circuit 350 may be configured to sense a plurality of optical sensors PHS through a plurality of sensing lines RX1 to RXo. For example, according to the design of the read-out circuit 350, the read-out circuit 350 may integrate the current flowing in at least one of the plurality of sensing lines RX1 to RXo (that is, also referred to as a current sensing method), or may sense the voltage of at least one of the plurality of the sensing lines RX1 to RXo (that is, also referred to as a voltage sensing method). The read-out circuit 350 may include a multiplexer configured to integrate current (or sense voltage) of at least one of the plurality of sensing lines RX1 to RXo. Thereinafter, for convenience of description, the read-out circuit 350 will be described as an example of adopting a current sensing method, but embodiments according to the present disclosure are not limited thereto.

The read-out circuit 350 may include an analog-to-digital converter 352 configured to convert the sensed analog voltage into a digital value.

The reset circuit 360 may be configured to supply a reset signal RST to the plurality of optical sensors PHS. When the reset signal RST is supplied to the optical sensors PHS, the electrical connection between the optical sensors PHS and the sensing line (e.g., the k-th sensing line RXk) may be disconnected. The timing at which the reset circuit 360 outputs the reset signal RST may be controlled by control of the timing controller 340.

One or more circuits constituting the panel driving circuit 222 may be located in the display device in the form of an integrated circuit (IC). For example, the data driving circuit 310 may include a source driver integrated circuit (SDIC).

The compensating circuit 226 may receive digital values from the read-out circuit 350. For example, the compensating circuit 226 may receive input sensing data DSEN1 from the read-out circuit 350. Accordingly, the compensating circuit 226 may generate sensing correction data SCD corresponding to each of the optical sensors PHS, as described above in FIG. 2A. The compensating circuit 226 may output the generated sensing correction data SCD to the read-out circuit 350.

One or more circuits constituting the panel driving circuit 222 may be formed together during the process of forming the display panel 210. For example, the scan driving circuit 320 may be formed together in the process of forming one or more circuit elements (e.g., transistors, etc.) included in the pixels PXL and/or the optical sensors PHS.

The data driving circuit 310, the scan driving circuit 320, the emission driving circuit 330, and the timing controller 340 may be merely classified according to their functions within the panel driving circuit 222, and two or more components may be functionally separated within one integrated circuit. For example, the data driving circuit 310 and the timing controller 340 may be implemented as one integrated circuit, but may be functionally separated within the integrated circuit. For example, the scan driving circuit 320 and the emission driving circuit 330 may be implemented as one integrated circuit, but may be functionally separated within the integrated circuit.

The panel driving circuit 222, the sensing circuit 224, and the compensating circuit 226 may be merely classified according to their functions within the display device, and the panel driving circuit 222, the sensing circuit 224, and the compensating circuit 226 may be functionally separated within one integrated circuit. For example, the panel driving circuit 222, the sensing circuit 224, and the compensating circuit 226 may be implemented in different integrated circuits, but in some cases, they may be functionally separated within one integrated circuit.

Figure 4:
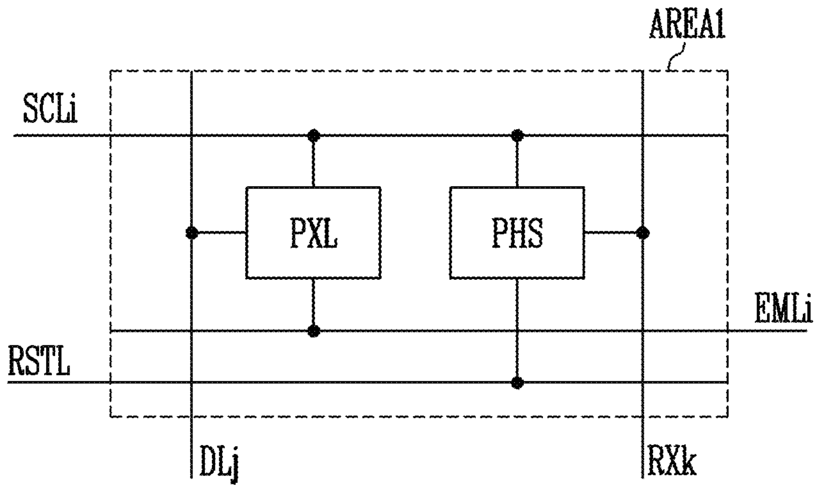
FIG. 4 is a drawing illustrating a pixel and an optical sensor in a first area according to some embodiments of the present disclosure.

FIG. 4 is a drawing illustrating a pixel and an optical sensor located in a first area according to some embodiments of the present disclosure.

The first area AREA1 may include an area where the i-th scan line SCLi (i is an integer between 1 and m) is located, the i-th emission control line EMLi is located, the j-th data line DLj (j is an integer between 1 and n) is located, and the k-th sensing line RXk (k is an integer between 1 and o) is located. The first area AREA1 may include an area where the reset control line RSTL is located.

Referring to FIG. 4, the pixels PXL located in the first area AREA1 may be electrically connected to the i-th scan line SCLi, the i-th emission control line EMLi, and the j-th data line DLj. The optical sensors PHS located in the first area AREA1 may be electrically connected to the i-th scan line SCLi, the k-th sensing line RXk, and the reset control line RSTL.

Figure 5:
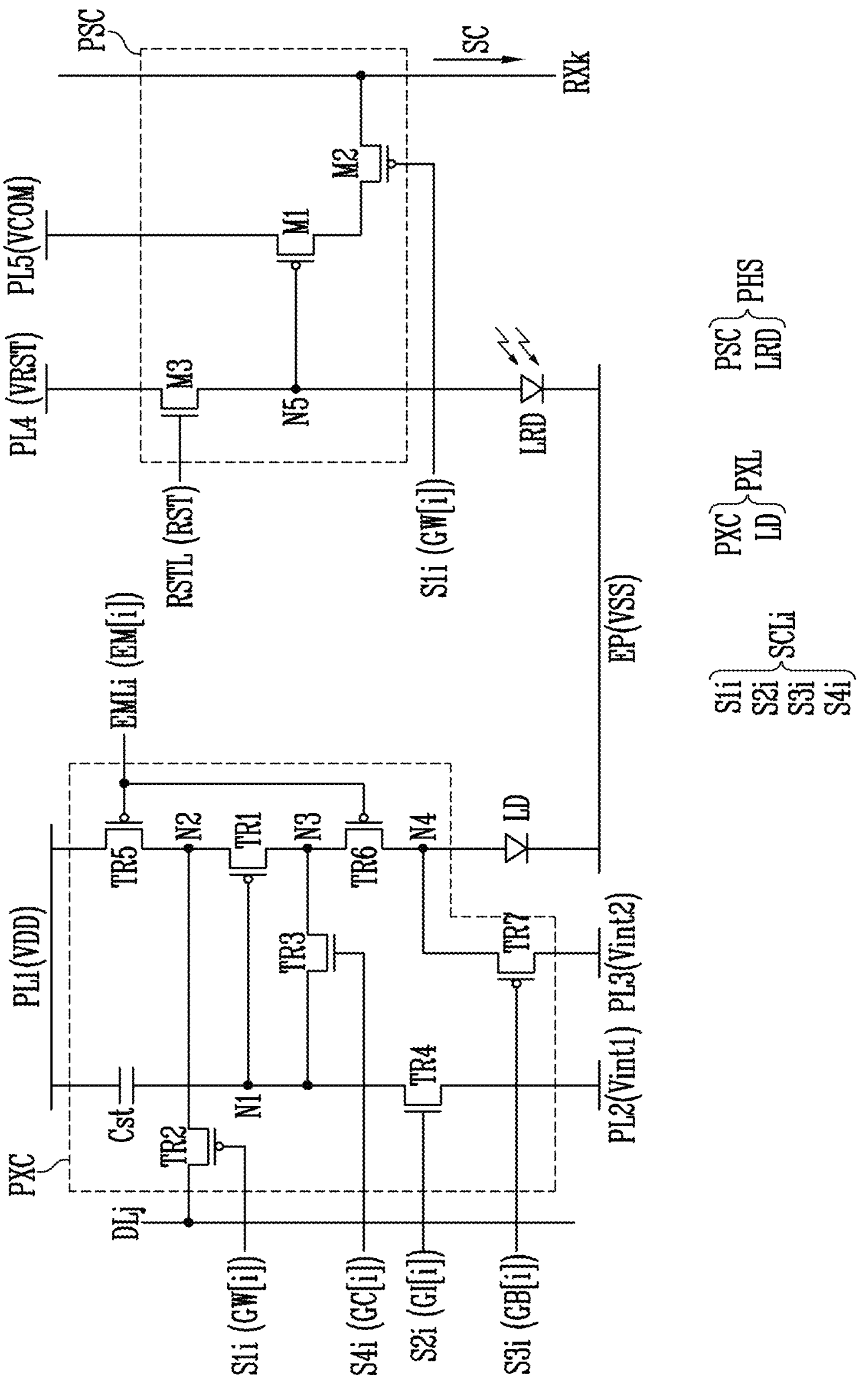
FIG. 5 is an equivalent circuit diagram of a pixel and an optical sensor according to some embodiments of the present disclosure.

FIG. 5 is an equivalent circuit diagram of a pixel and an optical sensor according to some embodiments of the present disclosure. Although FIG. 5 illustrates various components in an equivalent circuit diagram of a pixel and optical sensor according to some embodiments, embodiments according to the present disclosure are not limited thereto, and according to some embodiments, the pixel and/or optical sensor may include additional components or fewer components without departing from the spirit and scope of embodiments according to the present disclosure.

Referring to FIG. 5, the pixel PXL may include a pixel driving circuit PXC and a light emitting element LD. The optical sensor PHS may include an optical sensor driving circuit PSC and a light receiving element LRD.

The pixel driving circuit PXC may be configured to control the intensity of the current flowing through the light emitting element LD. The pixel driving circuit PXC may include two or more transistors and one or more capacitors. The pixel driving circuit PXC may be implemented in various ways by the design of a person skilled in the art, but with reference to the equivalent circuit diagram shown in FIG. 5 below, a structure in which the pixel driving circuit PXC includes seven transistors and one capacitor (also referred to as a 7T1C structure) will described as an example.

The pixel driving circuit PXC may include first to seventh pixel transistors TR1 to TR7 and one capacitor Cst.

The first pixel transistor TR1 may be configured to provide a current corresponding to the voltage level of the first node N1. The first node N1 may be electrically connected to the gate electrode of the first pixel transistor TR1. The second node N2 may be electrically connected to either the source electrode or the drain electrode of the first pixel transistor TR1. The third node N3 may be electrically connected to the other one of the source electrode or the drain electrode of the first pixel transistor TR1. The intensity of the current flowing in the first pixel transistor TR1 (or the intensity of the current flowing in the light emitting element LD) may be controlled depending on the intensity of the voltage applied to the first node N1. The first pixel transistor TR1 may be also referred to as a driving transistor.

The second pixel transistor TR2 may be configured to switch the electrical connection between the second node N2 and the data line DLj. The second pixel transistor TR2 may be configured to transmit a voltage (e.g., data voltage) applied to the data line DLj in response to the first scan signal GW[i] at the turn-on level to the second node N2. The first scan signal GW[i] may be input to the first scan line S1*i*.

The third pixel transistor TR3 may be configured to switch the electrical connection between the first node N1 and the third node N3. The third pixel transistor TR3 may switch the electrical connection between the first node N1 and the third node N3 in response to the fourth scan signal GC[i]. The fourth scan signal GC[i] may be applied to the fourth scan line S4*i*. When the third pixel transistor TR3 is turned on, the first pixel transistor TR1 may operate like a diode.

The fourth pixel transistor TR4 may be configured to switch the electrical connection between the first node N1 and the second power line PL2. The fourth pixel transistor TR4 may switch the electrical connection between the first node N1 and the second power line PL2 in response to the second scan signal GI[i]. The second scan signal GI[i] may be applied to the second scan line S2*i*. The first initialization voltage Vint1 may be applied to the second power line PL2. When the fourth pixel transistor TR4 is turned on, the voltage of the first node N1 may be initialized to the first initialization voltage Vint1.

The fifth pixel transistor TR5 may be configured to switch the electrical connection between the second node N2 and the first power line PL1. The fifth pixel transistor TR5 may switch the electrical connection between the second node N2 and the first power line PL1 in response to the emission control signal EM[i]. When the fifth pixel transistor TR5 is turned on, the first power voltage VDD may be applied to the second node N2.

The sixth pixel transistor TR6 may be configured to switch the electrical connection between the third node N3 and the fourth node N4. The sixth pixel transistor TR6 may switch the electrical connection between the third node N3 and the fourth node N4 in response to the emission control signal EM[i]. Referring to FIG. 5, the sixth pixel transistor TR6 and the fifth pixel transistor TR5 may be electrically connected to the same emission control line EMLi.

The seventh pixel transistor TR7 may be configured to switch the electrical connection between the fourth node N4 and the third power line PL3. The seventh pixel transistor TR7 may switch the electrical connection between the fourth node N4 and the third power line PL3 in response to the third scan signal GB[i]. When the seventh pixel transistor TR7 is turned on, the voltage of the fourth node N4 may be initialized to the second initialization voltage Vint2.

The capacitor Cst may be configured to maintain the voltage of the first node N1 for a period (e.g., a set or predetermined period) (e.g., one frame period). The capacitor Cst may include one electrode electrically connected to the first node N1 and the other electrode electrically connected to a power line (e.g., first power line PL1). A data voltage (or a voltage corresponding to the data voltage) may be applied to one electrode of the capacitor Cst, and the capacitor Cst may supply a voltage to the first node N1 during one frame period. The capacitor Cst may be also referred to as a storage capacitor.

Each of the first to seventh pixel transistors TR1 to TR7 may be n-type transistors or p-type transistors.

In an n-type transistor, a voltage at the turn-on level may be a high logic level voltage, and a voltage at the turn-off level may be a low logic level voltage. In a p-type transistor, a voltage at the turn-on level may be a low logic level voltage, and a voltage at the turn-off level may be a high logic level voltage.

In FIG. 5, among the first to seventh pixel transistors TR1 to TR7, the third pixel transistor TR3 and the fourth pixel transistor TR4 are n-type transistors, and the rest are p-type transistors. However, embodiments of the present disclosure are not limited thereto.

One or more transistors among the first to seventh pixel transistors TR1 to TR7 may include an oxide semiconductor (e.g., a metal oxide semiconductor layer). One or more transistors of the first to seventh pixel transistors TR1 to TR7 may include a silicon semiconductor (e.g., an amorphous silicon (a-Si) semiconductor or a low temperature polycrystalline silicon (LTPS) semiconductor). For example, the third pixel transistor TR3 and the fourth pixel transistor TR4 may include an oxide semiconductor, but embodiments of the present disclosure are not limited thereto. For example, the first pixel transistor TR1, the second pixel transistor TR2, and the fifth to seventh pixel transistors TR5 to TR7 may include a silicon semiconductor, but embodiments of the present disclosure are not limited thereto.

The light emitting element LD may be connected between the fourth node N4 and the sixth power line EP. The light emitting element LD may include an anode electrode and a cathode electrode. The fourth node N4 may be electrically connected to the anode electrode of the light emitting element LD. The sixth power line EP may be electrically connected to the cathode electrode of the light emitting element LD.

The light emitting element LD may include a light emitting layer. According to some embodiments, the light emitting layer may be located between the anode electrode and the cathode electrode. According to the type of light emitting layer, the light emitting element LD may be implemented as an organic light emitting element including an organic light emitting layer, an inorganic light emitting element including an inorganic light emitting layer, or a quantum dot light emitting element including quantum dots (e.g., nanorods), etc.

One pixel driving circuit PXC may be connected to two or more light emitting elements LD. Two or more light emitting elements LD may be connected to each other in series and/or parallel.

The optical sensor driving circuit PSC may include first to third sensor transistors M1, M2, and M3.

The first sensor transistor M1 may be configured to switch the electrical connection between the fifth power line PL5 and the second sensor transistor M2. The first sensor transistor M1 may switch the electrical connection between the fifth power line PL5 and the second sensor transistor M2 depending on the voltage level of the fifth node N5. The fourth power voltage VCOM may be applied to the fifth power line PL5.

The second sensor transistor M2 may be configured to switch the electrical connection between the first sensor transistor M1 and the sensing line RXk. The second sensor transistor M2 may electrically connect the first sensor transistor M1 and the sensing line RXk in response to a scan signal (e.g., the first scan signal GW[i]).

The third sensor transistor M3 may be configured to switch the electrical connection between the fourth power line PL4 and the fifth node N5. The third sensor transistor M3 may switch the electrical connection between the fourth power line PL4 and the fifth node N5 in response to the reset signal RST. When the third sensor transistor M3 is turned on, the voltage of the fifth node N5 may be initialized to the third power voltage VRST. The third power voltage VRST may be the turn-on level voltage (e.g., low logic level voltage) of the first sensor transistor M1.

Each of the first to third sensor transistors M1, M2, and M3 may be implemented as a p-type transistor or an n-type transistor. For example, each of the first to third sensor transistors M1, M2, and M3 may include one of an amorphous silicon semiconductor, a low-temperature polycrystalline silicon semiconductor, and an oxide semiconductor.

In FIG. 5, the third sensor transistor M3 is implemented as an n-type transistor and the first sensor transistor M1 and the second sensor transistor M2 are implemented as a p-type transistor. However, the embodiments of the present disclosure are not limited thereto.

The light receiving element LRD may electrically connect the fifth node N5 and the sixth power line EP in response to light. For example, the light receiving device LRD may be implemented as a photo diode.

According to some embodiments of the present disclosure, the process of current flowing through the sensing line RXk is briefly described as follows.

According to some embodiments of the present disclosure, when light is applied to the light receiving device LRD, current may flow through the light receiving device LRD. When current flows through the light receiving element LRD, the voltage of the fifth node N5 may gradually decrease. When the voltage of the fifth node N5 gradually decreases and becomes lower than the threshold voltage of the first sensor transistor M1, the first pixel transistor M1 may be turned on. When the first scan signal GW[i] at the turn-on level is input to the second sensor transistor M2, the second sensor transistor M2 is turned on. As a result, when the first sensor transistor M1 and the second sensor transistor M2 are turned on, a current path extending from the fifth power line PL5 to the sensing line RXk may be formed. By integrating the sensing current SC flowing through the sensing line RXk (or by sensing the voltage), the amount of light incident on the light receiving element LRD may be calculated. Here, the amount of light incident on the light receiving element LRD may be proportional to the width (or size) of the light receiving element LRD.

Embodiments of the present disclosure may measure the amount of reflected light reflected from objects adjacent to the optical sensors PHS by using the optical sensors PHS.

The electronic device according to some embodiments of the present disclosure may obtain (or generate) a pattern (e.g., a fingerprint pattern, etc.) of an object adjacent to the optical sensors PHS by sensing the optical sensors PHS. As a result, the electronic device according to some embodiments of the present disclosure may provide a biometric authentication (e.g., fingerprint authentication, etc.) function.

Figure 6:
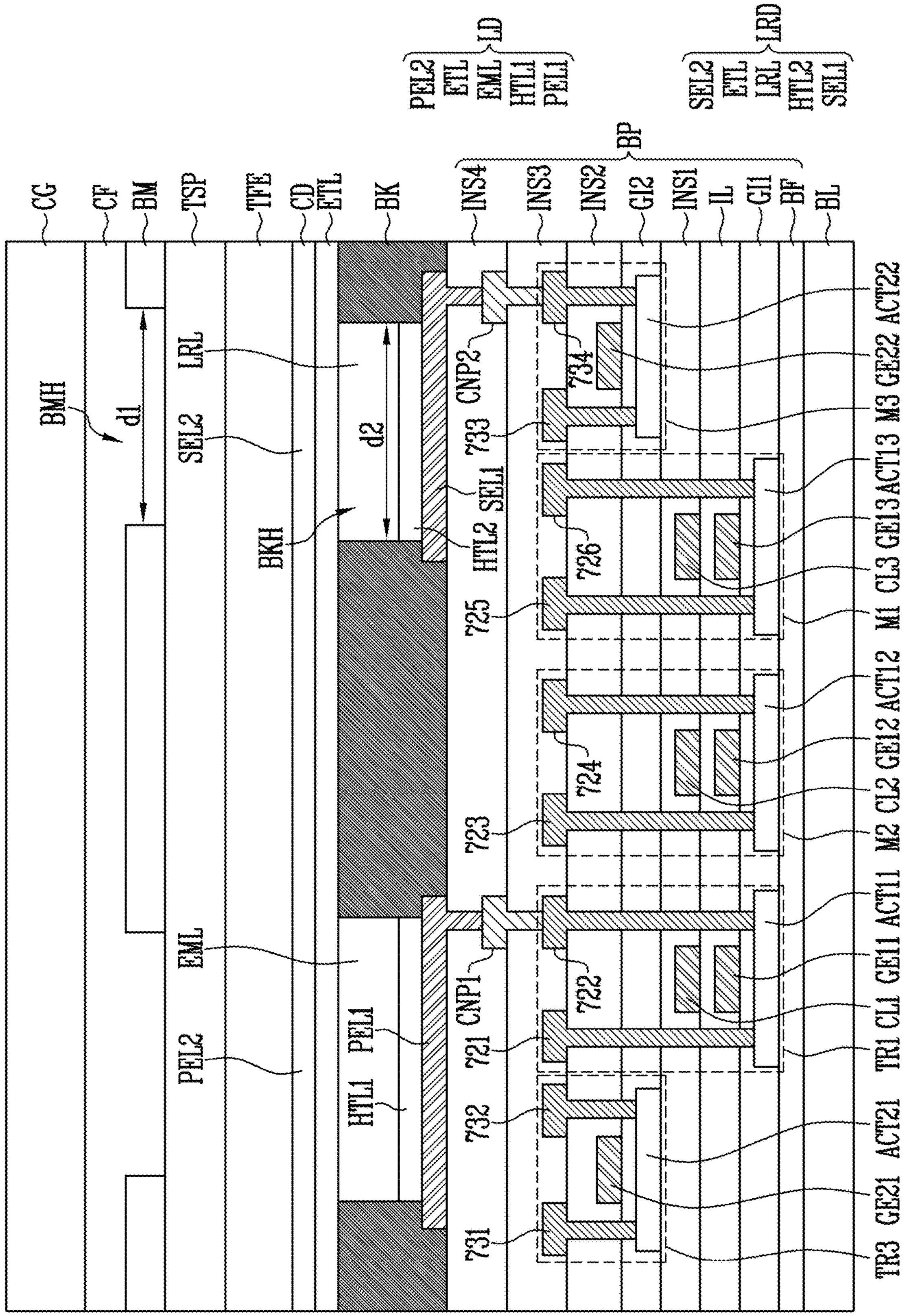
FIG. 6 is a cross-sectional view illustrating a portion of the configuration of one of pixels and one of optical sensors in a cross-sectional view of a display device according to some embodiments of the present disclosure.

FIG. 6 is a cross-sectional view illustrating a portion of the configuration of one of pixels and one of optical sensors in a cross-sectional view of a display device according to some embodiments of the present disclosure.

Figure 7:
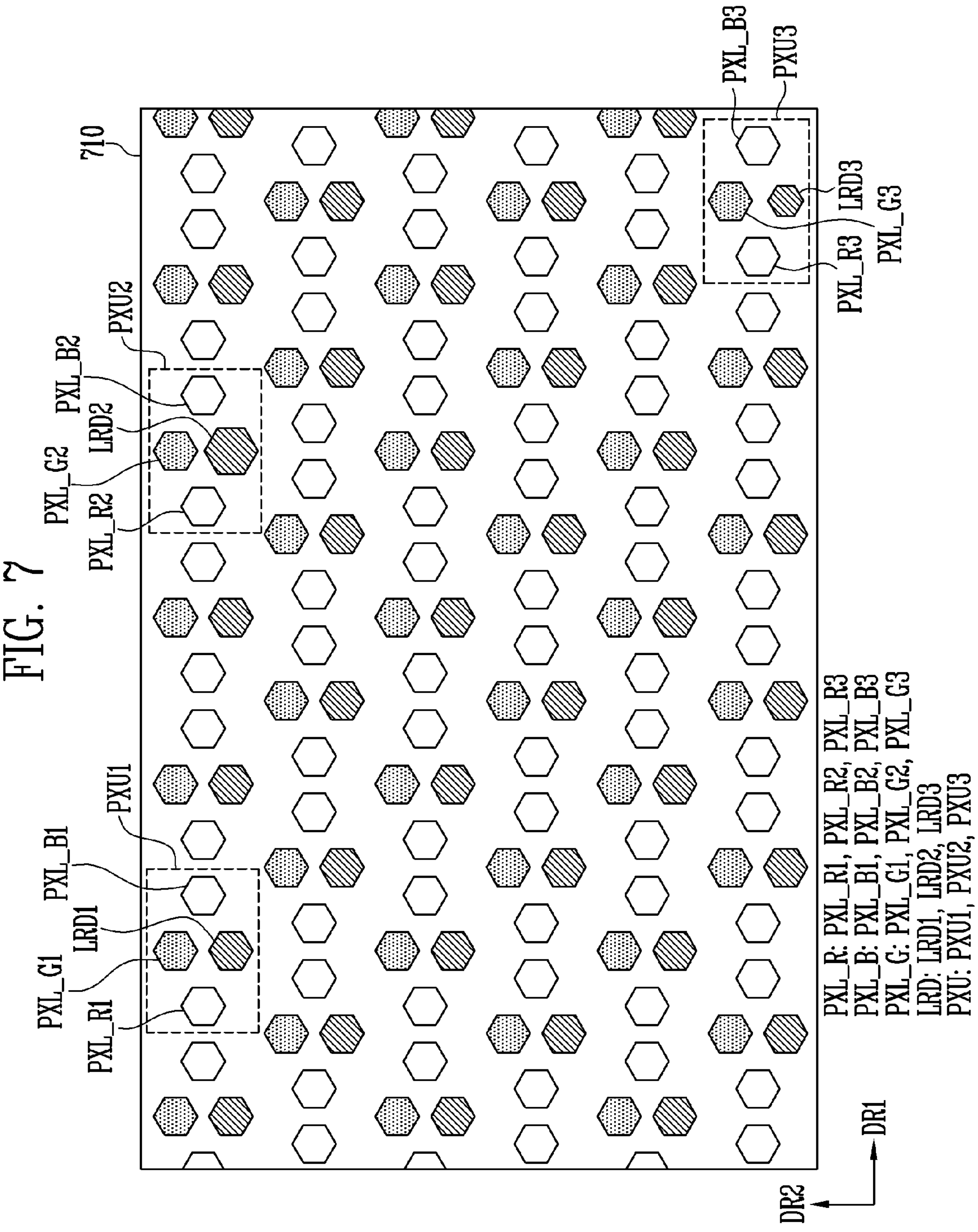
FIG. 7 is a drawing illustrating unit pixels of a display panel according to some embodiments of the present disclosure.

FIG. 7 is a drawing illustrating unit pixels of a display panel according to some embodiments of the present disclosure.

First, referring to FIGS. 1 to 6, a backplane structure (or a circuit layer) BP of the display panel 210 may include pixel transistors TR1 to TR7 and sensor transistors M1, M2, and M3.

Referring to FIG. 6, a first pixel transistor TR1, a third pixel transistor TR3, a first sensor transistor M1, a second sensor transistor M2, and a third sensor transistor M3 are shown.

The base layer BL may be made of an insulating material such as glass, resin, etc. Additionally, the base layer BL may be made of a material with flexibility so that it can be bent or folded, and may have a single-layer structure or a multi-layer structure.

The backplane structure BP including a pixel driving circuit and a sensor driving circuit may be provided on the base layer BL. The backplane structure BP may include a semiconductor layer, a plurality of conductive layers, and a plurality of insulating layers. For example, the base layer BL may include a first base layer, a first barrier layer, a second base layer, and a second barrier layer, etc., which are sequentially stacked. The first base layer and the second base layer may include polyimide (PI), polyether sulfone (PES), polyarylate, polyether imide (PEI), polyethylene naphthalate (PEN), polyethylene terephthalate (PET), polyphenylene sulfide (PPS), polycarbonate (PC), cellulose triacetate (CTA), and/or cellulose acetate propionate (CAP), etc. The first barrier layer and the second barrier layer may include an inorganic insulating material such as silicon oxide, silicon oxynitride, and/or silicon nitride. The base layer BL may be flexible.

A buffer layer BF may be formed on the base layer BL. The buffer layer BF may prevent or reduce instances of contaminants or impurities diffusing into pixel transistors (e.g., first to seventh pixel transistors TR1 to TR7) and sensor transistors (e.g., first to third sensor transistors M1, M2, and M3). The buffer layer BF may be omitted according to the material and process conditions of the base layer BL. The buffer layer BF may include an inorganic insulating material such as silicon oxide, silicon oxynitride, or silicon nitride. The buffer layer BF may have a single-layer structure or a multi-layer structure including the above-described materials. The buffer layer BF may be omitted according to the material and process conditions of the base layer BL.

First to third active patterns ACT11, ACT12, and ACT13 may be provided on the buffer layer BF. According to some embodiments, the first to third active patterns ACT11, ACT12, and ACT13 may be formed of a polycrystalline silicon semiconductor. For example, the first to third active patterns ACT11, ACT12, and ACT13 may be formed through a low temperature polycrystalline silicon (LTPS) process.

A first gate insulating layer GI1 may be provided on the first to third active patterns ACT11, ACT12, and ACT13. The first gate insulating layer GI1 may be an inorganic insulating layer including an inorganic material. The first gate insulating layer GI1 may include silicon oxide ($SiO_2$), silicon nitride ($SiN_x$) (x is a positive number), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZnO_x$), etc. Zinc oxide ($ZnO_x$) may be zinc oxide (ZnO), and/or zinc peroxide ($ZnO_2$).

First to third gate electrodes GE11, GE12, and GE13 may be provided on the first gate insulating layer GI1. The first gate electrode GE11 may overlap the channel area of the first active pattern ACT11. The second gate electrode GE12 may overlap the channel area of the second active pattern ACT12. The third gate electrode GE13 may overlap the channel area of the third active pattern ACT13.

The first to third gate electrodes GE11, GE12, and GE13 may include metal. For example, the first to third gate electrodes GE11, GE12, and GE13 may be made of at least one among metal such as gold (Au), silver (Ag), aluminum (Al), molybdenum (Mo), chromium (Cr), titanium (Ti), nickel (Ni), neodymium (Nd), and copper (Cu), or an alloy thereof. Additionally, the first to third gate electrodes GE11, GE12, and GE13 may be formed as a single layer or may be formed as a multi-layer of two or more materials among metals and alloys thereof.

An interlayer insulating layer IL may be provided on the first to third gate electrodes GE11, GE12, and GE13. The interlayer insulating layer IL may be an inorganic insulating layer including an inorganic material. Inorganic materials may include polysiloxane, silicon nitride, silicon oxide, and silicon oxynitride.

Conductive patterns CL1, CL2, and CL3 may be provided on the interlayer insulating layer IL. Referring to the above-described FIG. 5, the conductive patterns CL1, CL2, and CL3 may form at least one of one electrode of the capacitor Cst, scan lines (e.g., first to fourth scan lines S1*i* to S4*i*), a reset control line RSTL, a data line DLj, a sensing line RXk, or power lines (e.g., PL1 to PL5).

The conductive patterns CL1, CL2, and CL3 may be made of at least one among metal such as gold (Au), silver (Ag), aluminum (Al), molybdenum (Mo), chromium (Cr), titanium (Ti), nickel (Ni), neodymium (Nd), and copper (Cu), or an alloy thereof. The conductive patterns CL1, CL2, and CL3 may be formed as a single layer, or may be formed as a multilayer of two or more materials among metals and alloys thereof.

A first insulating layer INS1 may be provided on the conductive patterns CL1, CL2, and CL3. The first insulating layer INS1 may be an inorganic insulating layer including an inorganic material. Inorganic materials may include polysiloxane, silicon nitride, silicon oxide, and silicon oxynitride.

A fourth active pattern ACT21 and a fifth active pattern ACT22 may be provided on the first insulating layer INS1. According to some embodiments, the fourth and fifth active patterns ACT21 and ACT22 may be formed of an oxide semiconductor. For example, the fourth and fifth active patterns ACT21 and ACT22 may be formed through a metal oxide semiconductor formation process. For example, the metal oxide semiconductor may include indium zinc oxide (IZO), indium tin zinc oxide (ITZO), indium gallium zinc oxide (IGZO), etc. However, embodiments of the present disclosure are not limited thereto.

A second gate insulating layer GI2 may be provided on the fourth active pattern ACT21 and the fifth active pattern ACT22. The second gate insulating layer GI2 may be an inorganic insulating layer including an inorganic material. For example, one or more of polysiloxane, silicon nitride, silicon oxide, and silicon oxynitride may be selected as the inorganic material.

Fourth and fifth gate electrodes GE21 and GE22 may be provided on the second gate insulating layer GI2. The fourth gate electrode GE21 may overlap a channel area of the fourth active pattern ACT21. The fifth gate electrode GE22 may overlap the channel area of the fifth active pattern ACT22. The fourth and fifth gate electrodes GE21 and GE22 may be made of metal. For example, the fourth and fifth gate electrodes GE21 and GE22 may be made of at least one of metals such as gold (Au), silver (Ag), aluminum (Al), molybdenum (Mo), chromium (Cr), titanium (Ti), nickel (Ni), neodymium (Nd), or copper (Cu), or an alloy thereof. Additionally, the fourth and fifth gate electrodes GE21 and GE22 may be formed as a single layer or may be formed as a multilayer of two or more materials among metals and alloys thereof.

A second insulating layer INS2 may be provided on the fourth and fifth gate electrodes GE21 and GE22. For example, the second insulating layer INS2 may be an inorganic insulating layer including an inorganic material. For example, one or more of polysiloxane, silicon nitride, silicon oxide, and silicon oxynitride may be selected as the inorganic material.

The first source/drain electrodes 721 and 722, the second source/drain electrodes 723 and 724, the third source/drain electrodes 725 and 726, the fourth source/drain electrodes 731 and 732, and the fifth source/drain electrodes 733 and 734 may be provided on the second insulating layer INS2. The first to fifth source/drain electrodes 721, 722, 723, 724, 725, 726, 731, 732, 733, and 734 may be connected to the first to fifth active patterns ACT11, ACT12, ACT13, ACT21, and ACT22 corresponding thereto through contact holes, respectively.

The first to fifth source/drain electrodes 721, 722, 723, 724, 725, 726, 731, 732, 733, and 734 may include metal. The first to fifth source/drain electrodes 721, 722, 723, 724, 725, 726, 731, 732, 733, and 734 may include a material with excellent conductivity. For example, the first to fifth source/drain electrodes 721, 722, 723, 724, 725, 726, 731, 732, 733, and 734 may include a conductive material including molybdenum (Mo), aluminum (Al), copper (Cu), titanium (Ti), and the like. The first to fifth source/drain electrodes 721, 722, 723, 724, 725, 726, 731, 732, 733, and 734 may be formed in a multi-layer structure or a single-layer structure including the above materials. For example, the first to fifth source/drain electrodes 721, 722, 723, 724, 725, 726, 731, 732, 733, and 734 may have a multi-layer structure of Ti/Al/Ti.

The third insulating layer INS3 may be provided on the first to fifth source/drain electrodes 721, 722, 723, 724, 725, 726, 731, 732, 733, and 734. For example, the third insulating layer INS3 may be an organic insulating layer including an organic material. The third insulating layer INS3 may include an organic material such as general-purpose polymers such as polymethylmethacrylate and polystyrene, polymer derivatives with phenolic groups, acrylic polymers, imide polymers, aryl ether polymers, amide polymers, fluorine-based polymers, p-xylene-based polymers, vinyl alcohol-based polymers, and blends thereof. The third insulating layer INS3 may function to planarize areas on the first to fifth source/drain electrodes 721, 722, 723, 724, 725, 726, 731, 732, 733, and 734.

Connection patterns CNP1 and CNP2 may be provided on the third insulating layer INS3. The first connection pattern CNP1 may be connected to the first drain electrode 722 through a contact hole penetrating the third insulating layer INS3. The second connection pattern CNP2 may be connected to the fifth drain electrode 734 (or source electrode) through a contact hole penetrating the third insulating layer INS3.

The connection patterns CNP1 and CNP2 may be made of at least one among metal such as gold (Au), silver (Ag), aluminum (Al), molybdenum (Mo), chromium (Cr), titanium (Ti), nickel (Ni), neodymium (Nd), and copper (Cu), or an alloy thereof.

A fourth insulating layer INS4 may be located on the connection patterns CNP1 and CNP2. The fourth insulating layer INS4 may be an organic insulating layer including an organic material. The fourth insulating layer INS4 may include an organic material such as general-purpose polymers such as polymethylmethacrylate and polystyrene, polymer derivatives with phenolic groups, acrylic polymers, imide polymers, aryl ether polymers, amide polymers, fluorine-based polymers, p-xylene-based polymers, vinyl alcohol-based polymers, and blends thereof. The fourth insulating layer INS4 may function to planarize areas on the connection patterns CNP1 and CNP2.

A pixel layer including a first pixel electrode PEL1, a first sensor electrode SEL1, and a bank layer BK may be provided on the fourth insulating layer INS4.

The pixel layer may include a light emitting element LD connected to a pixel driving circuit (e.g., pixel driving circuit PXC of FIG. 5) and a light receiving element LRD connected to a sensor circuit (e.g., optical sensor driving circuit PSC of FIG. 5).

According to some embodiments, the light emitting element LD may include a first pixel electrode PEL1, a hole transport layer HTL1, an emission layer EML, an electron transport layer ETL, and a second pixel electrode PEL2. According to some embodiments, the light receiving element LRD may include a first sensor electrode SEL1, a second hole transport layer HTL2, a light receiving layer LRL, an electron transport layer ETL, and a second sensor electrode SEL2.

According to some embodiments, the first pixel electrode PEL1 and the first sensor electrode SEL1 may include metal layers such as silver (Ag), magnesium (Mg), aluminum (Al), platinum (Pt), palladium (Pd), gold (Au), nickel (Ni), neodymium (Nd), iridium (Ir), chromium (Cr), and alloys thereof, and/or indium tin oxide (ITO), indium zinc oxide (IZO), zinc oxide (ZnO), indium tin zinc oxide (ITZO), etc. The first pixel electrode PEL1 may be connected to the first drain electrode 722 through a contact hole. The first sensor electrode SEL1 may be connected to the fifth drain electrode 734 through a contact hole.

The first pixel electrode PEL1 and the first sensor electrode SEL1 may be formed in the same process through patterning using a mask.

A bank layer (or pixel definition layer) BK that divides the light emitting area and the light receiving area may be provided on the fourth insulating layer INS4 on which the first pixel electrode PEL1 and the first sensor electrode SEL1 are formed. The bank layer BK may be an organic insulating layer including an organic material. Organic materials may include organic insulating materials such as acrylic resin, epoxy resin, phenol resin, polyamide resin, polyimide resin, unsaturated polyester resin, polyphenylenether resin, polyphenylene sulfide resin, or benzocyclobutene (BCB).

The bank layer BK may include a light absorbing material or may be coated with a light absorbing material to absorb light incident from the outside. For example, the bank layer BK may include a carbon-based black pigment. However, it is not limited thereto, and the bank layer BK may include chromium (Cr), molybdenum (Mo), an alloy (MoTi) of molybdenum and titanium with high light absorption, and opaque metallic materials such as tungsten (W), vanadium (V), niobium (Nb), tantalum (Ta), manganese (Mn), cobalt (Co), or nickel (Ni).

The bank layer BK may include a second opening BKH corresponding to the light emitting area and the light receiving area.

A first hole transport layer HTL1 may be provided on the upper surface of the first pixel electrode PEL1 exposed by the bank layer BK. A second hole transport layer HTL2 may be provided on the exposed upper surface of the first sensor electrode SEL1. Holes may move to the light emitting layer EML through the first hole transport layer HTL1, and holes may move to the light receiving layer LRL through the second hole transport layer HTL2.

Depending on the materials of the emitting layer EML and the light receiving layer LRL, the first hole transport layer HTL1 and the second hole transport layer HTL2 may be the same or different.

An emission layer EML may be provided on the first hole transport layer HTL1. According to some embodiments, the light emitting layer EML may include an organic light emitting layer. Depending on the organic material included in the light emitting layer EML, the light emitting layer EML may emit light in a red wavelength band, light in a green wavelength band, or light in a blue wavelength band.

According to some embodiments, an electron blocking layer may be provided on the second hole transport layer HTL2 in the light receiving area. The electron blocking layer may prevent or reduce charges of the light receiving layer LRL from moving to the hole transport layer HTL2. According to some embodiments, the electron blocking layer may be omitted.

The light receiving layer LRL may be located on the second hole transport layer HTL2. The light receiving layer LRL may emit electrons in response to light in a specific wavelength band. Therefore, the intensity (or quantity) of light may be sensed.

According to some embodiments, the light receiving layer LRL may include a low molecular weight organic material. For example, the light receiving layer LRL may be composed of a phthalocyanine compound including one or more metals selected from the group consisting of copper (Cu), iron (Fe), nickel (Ni), cobalt (Co), manganese (Mn), aluminum (Al), palladium (Pd), tin (Sn), Indium (In), lead (Pb), titanium (Ti), rubidium (Rb), vanadium (V), gallium (Ga), terbium (Tb), cerium (Ce), lanthanum (La) and zinc (Zn).

The low molecular weight organic materials included in the light receiving layer LRL may include a phthalocyanine compound including one or more metals selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La) and zinc (Zn).

The light receiving layer LRL may be composed of two layers (bi-layer). The light receiving layer LRL may include a layer including a phthalocyanine compound and a layer including C60.

The light receiving layer LRL may include a mixing layer in which a phthalocyanine compound and C60 are mixed.

However, this is an example, and the light receiving layer LRL may include a polymer organic layer.

According to some embodiments, the light detection band of the light receiving element LRD may be determined depending on the selection of the metal component of the phthalocyanine compound included in the light receiving layer LRL. For example, in the case of the phthalocyanine compound including copper, it may absorb visible light wavelengths in the band of approximately 600 to 800 nm. In the case of the phthalocyanine compound including tin (Sn), it may absorb near-infrared wavelengths in the band of approximately 800 to 1000 nm.

Depending on the selection of the metal included in the phthalocyanine compound, an optical sensor capable of detecting a wavelength in the band desired by the user may be implemented. For example, the light receiving layer LRL may be formed to selectively absorb light in a red wavelength band, light in a green wavelength band, or light in a blue wavelength band.

According to some embodiments, the area of the light receiving area may be smaller than the area of the light emitting area. The area of the light receiving area may be proportional to the first width d1 of the first opening BMH and/or the second width d2 of the second opening BKH, which will be described later.

A second pixel electrode PEL2 and a second sensor electrode SEL2 may be provided on the electron transport layer (ETL). The second pixel electrode PEL2 and the second sensor electrode SEL2 may be implemented as a common electrode CD integrally formed in the display area. The second power voltage VSS may be supplied to the second pixel electrode PEL2 and the second sensor electrode SEL2.

The common electrode CD may be made of a metal layer such as silver (Ag), magnesium (Mg), aluminum (Al), platinum (Pt), palladium (Pd), gold (Au), nickel (Ni), neodymium (Nd), iridium (Ir), chromium (Cr) and/or a transparent conductive layer such as indium tin oxide (ITO), indium zinc oxide (IZO), zinc oxide (ZnO), indium tin zinc oxide (ITZO). According to some embodiments, the common electrode CD may be made of a double layer or more multiple layers including a thin metal layer. For example, the common electrode CD may be made of a triple layer of ITO/Ag/ITO.

An encapsulation layer TFE may be provided on the common electrode CD including the second pixel electrode PEL2 and the second sensor electrode SEL2. The encapsulation layer TFE may be made of a single layer, or may be made of multiple layers. According to some embodiments, the encapsulation layer TFE may have a stacked structure in which inorganic materials, organic materials, and inorganic materials are deposited in that order. The uppermost layer of the encapsulation layer TFE may be formed of an inorganic material.

According to some embodiments of the present disclosure, a touch screen panel TSP may be provided on the encapsulation layer TFE. The touch screen panel TSP may include touch electrodes configured to detect a user's touch. The touch screen panel TSP may be implemented using a self-capacitance method or a mutual-capacitance method.

According to some embodiments of the present disclosure, the touch screen panel TSP may be an in-cell type that is formed integrally in the process of forming the display panel 210 (see FIGS. 2A, 2B, and 3). The touch screen panel TSP may be an on-cell type (also called an add-on type) that is formed separately from the display panel 210 and attached to the display panel 210. Thereinafter, for convenience of description, the touch screen panel TSP is described as an in-cell type as an example, but embodiments of the present disclosure are not limited thereto.

According to some embodiments, the display device may include a pressure sensor configured to sense touch pressure. The pressure sensor may be formed integrally with the touch screen panel TSP, or may be formed as a separate component from the touch screen panel TSP.

According to some embodiments of the present disclosure, the pressure sensor may be an in-cell type that is formed integrally in the process of forming the display panel 210 (see FIGS. 2A, 2B, and 3). The pressure sensor may be an on-cell type (or add-on type) that is formed separately from the display panel 210 and attached to the display panel 210. When the pressure sensor of the add-on type is attached to the display panel 210, for example the pressure sensor may be attached to the lower surface of the base layer BL.

The display device according to some embodiments of the present disclosure includes the pressure sensor of the add-on type, but the embodiments of the present disclosure are not limited thereto.

A black matrix layer BM may be located on the touch screen panel TSP. According to some embodiments, a color filter layer CF may be located on the black matrix layer BM. According to some embodiments, the color filter layer CF may be omitted. A cover glass CG may be located on the uppermost layer (e.g., the upper layer of the color filter layer CF) of the display panel.

At least a portion of the black matrix layer BM may be arranged to overlap the bank layer BK. From the perspective of the pixel, the black matrix layer BM may function to distinguish each of a plurality of pixels. The black matrix layer BM May function to distinguish each pixel so that light does not mix between the plurality of pixels. From the perspective of the optical sensor, the black matrix layer BM may function as an optical system that collects light.

For example, referring to FIG. 6, the black matrix layer BM may include a first opening BMH. At least a portion of the black matrix layer BM may be removed from the first opening BMH. The first opening BMH may be arranged to overlap the light receiving element LRD. The black matrix layer BM may function like an optical system due to the first opening BMH.

The amount of light (e.g., reflected light emitted from the light emitting element LD and reflected by an external object, etc.) incident in the direction of the light receiving element LRD may be adjusted by an optical system (e.g., the first width d1) formed by the black matrix layer BM. When the first width d1 of the first opening BMH is narrow, a size of the light receiving element LRD may be small. Conversely, when the first width d1 of the first opening BMH is wide, the size of the light receiving element LRD may be large.

At least a portion of the bank layer BK may be removed from the second opening BKH. The second opening BKH may be arranged to overlap the light receiving element LRD. When the second width d2 of the second opening BKH is narrow, a size of the light receiving element LRD may be small. Conversely, when the second width d2 of the second opening BKH is wide, the size of the light receiving element LRD may be large. Accordingly, the amount of light may be adjusted by the second width d2 of the second opening BKH. That is, the amount of light (e.g., the reflected light emitted from the light emitting element LD and reflected by an external object, etc.) incident in the direction of the light receiving element LRD may be determined by the second width d2.

Referring to FIG. 7, a plurality of unit pixels PXU may be located on the display panel 710 according to some embodiments of the present disclosure. The display panel 710 of FIG. 7 may correspond to the display panel 210 of FIG. 2A and the display panel 210 of FIG. 2B. Hereinafter, some redundant descriptions may be omitted.

Each of the plurality of unit pixels PXU may include a plurality of pixels PXL and at least one light receiving element LRD. For example, each of the unit pixels PXU may include a red pixel PXL_R, a blue pixel PXL_B, a green pixel PXL_G, and a light receiving element LRD (or any one of the optical sensors PHS). Hereinafter, for convenience of description, it will be described that the light receiving elements LRD are located in the unit pixels PXU, but embodiments according to the present invention are not limited thereto.

The red pixel PXL_R may be configured to emit light in a red wavelength band. For example, the red pixel PXL_R may be configured to emit light with a wavelength of about 630 to 750 nm.

The green pixel PXL_G may be configured to emit light in a green wavelength band. For example, the green pixel PXL_G may be configured to emit light with a wavelength in a range of 495 to 570 nanometers (nm) (or about 495 to 570 nm).

The blue pixel PXL_B may be configured to emit light in the blue wavelength band. For example, the blue pixel PXL_B may be configured to emit light with a wavelength in a range of 450 to 495 nm (or about 450 to 495 nm).

Referring to FIG. 7, the green pixel PXL_G and the light receiving element LRD in any one of the unit pixels PXU may be shown to be located adjacent to each other in the second direction DR2. Additionally, the light receiving element LRD may be shown to be arranged diagonally adjacent to the red pixel PXL_R and blue pixel PXL_B, and the green pixel PXL_G may be shown to be arranged diagonally adjacent to the red pixel PXL_R and blue pixel PXL_B. As a result, one unit pixel PXU may be shown to have an overall diamond shape. However, embodiments according to the present disclosure are not limited thereto. For example, the red pixel PLX_R and the blue pixel PXL_B may be located adjacent to the light receiving element LRD in the first direction DR1. Thereinafter, for convenience of description, an example will be given where one unit pixel PXU has an overall diamond shape.

The red sub-pixel PXL_R and the blue sub-pixel PXL_B may be located adjacent to each other in the first direction DR1. The light receiving element LRD and the green sub-pixel PXL_G may be located adjacent to each other in the second direction DR2.

In the display panel 710, at least one pixel included in each unit pixel PXU may emit light. For example, the green pixel PXL_G included in the unit pixels PXU may emit light. According to some embodiments, at least one of the red pixel PXL_R or the blue pixel PXL_B included in the unit pixels PXU may not emit light.

The plurality of unit pixels PXU may include a first unit pixel PXU1, a second unit pixel PXU2, and a third unit pixel PXU3. The first unit pixel PXU1 may include a first red pixel PXL_R1, a first blue pixel PXL_B1, a first green pixel PXL_G1, and a first light receiving element LRD1. Additionally, the second unit pixel PXU2 may include a second red pixel PXL_R2, a second blue pixel PXL_B2, a second green pixel PXL_G2, and a second light receiving element RD2, and the third unit pixel PXU3 may include a third red pixel PXL_R3, a third blue pixel PXL_B3, a third green pixel PXL_G3, and a third light receiving element LRD3.

Meanwhile, the size of the light receiving element LRD may be determined depending on the first opening BMH and/or the second opening BKH. For example, the size of the light receiving element LRD may be determined by the smaller of the first width d1 of the first opening BMH and/or the second width d2 of the second opening BKH.

Therefore, the sizes of each of the first to third light receiving elements LRD1 to LRD3 may be different. Accordingly, even if light of the same intensity is irradiated to the display panel 210, the amount of light incident on each of the first to third light receiving elements LRD1 to LRD3 may be different. That is, the intensity of the sensing current SC flowing through the sensing line RXk (see FIG. 5) of each of the optical sensors PHS including the first to third light receiving elements LRD1 to LRD3 may be different from each other, and the sensing reliability of optical sensors PHS may deteriorate.

Next, a driving method of an electronic device according to some embodiments of the present invention will be described with reference to FIGS. 8 to 11.

Figure 8:
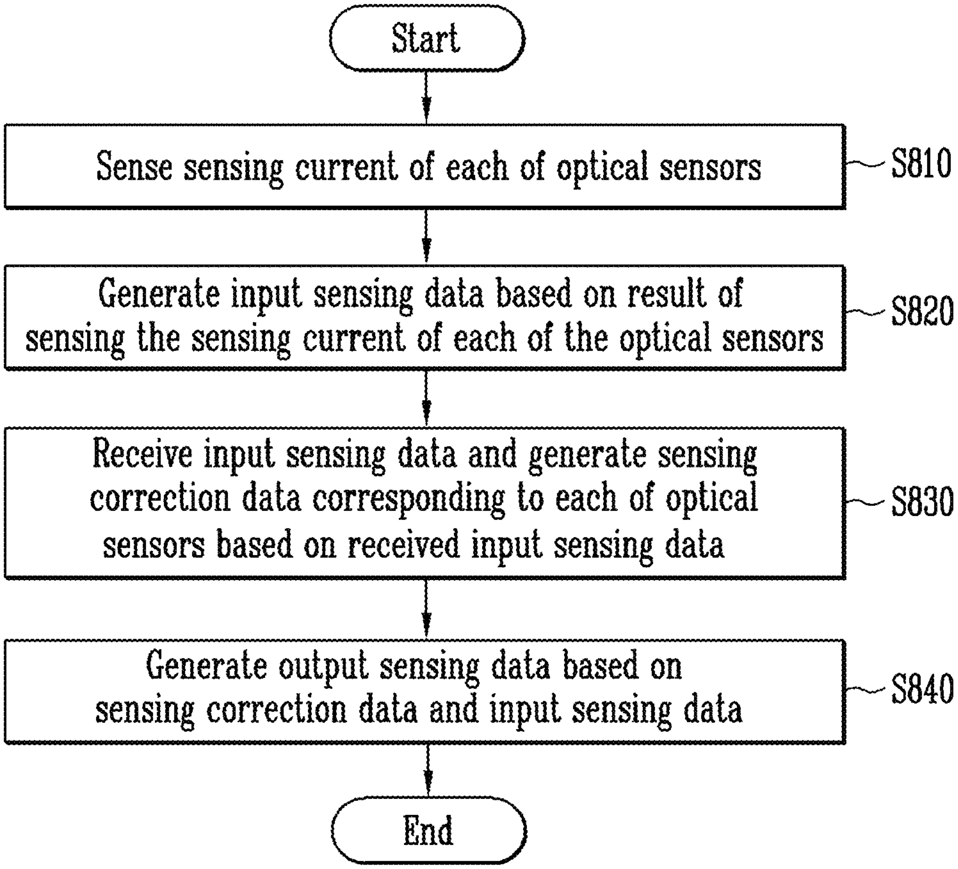
FIG. 8 is a flowchart illustrating aspects of a driving method of an electronic device according to some embodiments of the present disclosure.

FIG. 8 is a flowchart illustrating a driving method of an electronic device according to some embodiments of the present disclosure. Although FIG. 8 illustrates various operations in a driving method of an electronic device, embodiments according to the present disclosure are not limited thereto, and according to some embodiments, the driving method may include additional operations, or fewer operations, or the order of operations may vary, unless otherwise stated explicitly or implied, without departing from the spirit and scope of embodiments according to the present disclosure.

Figure 9A:
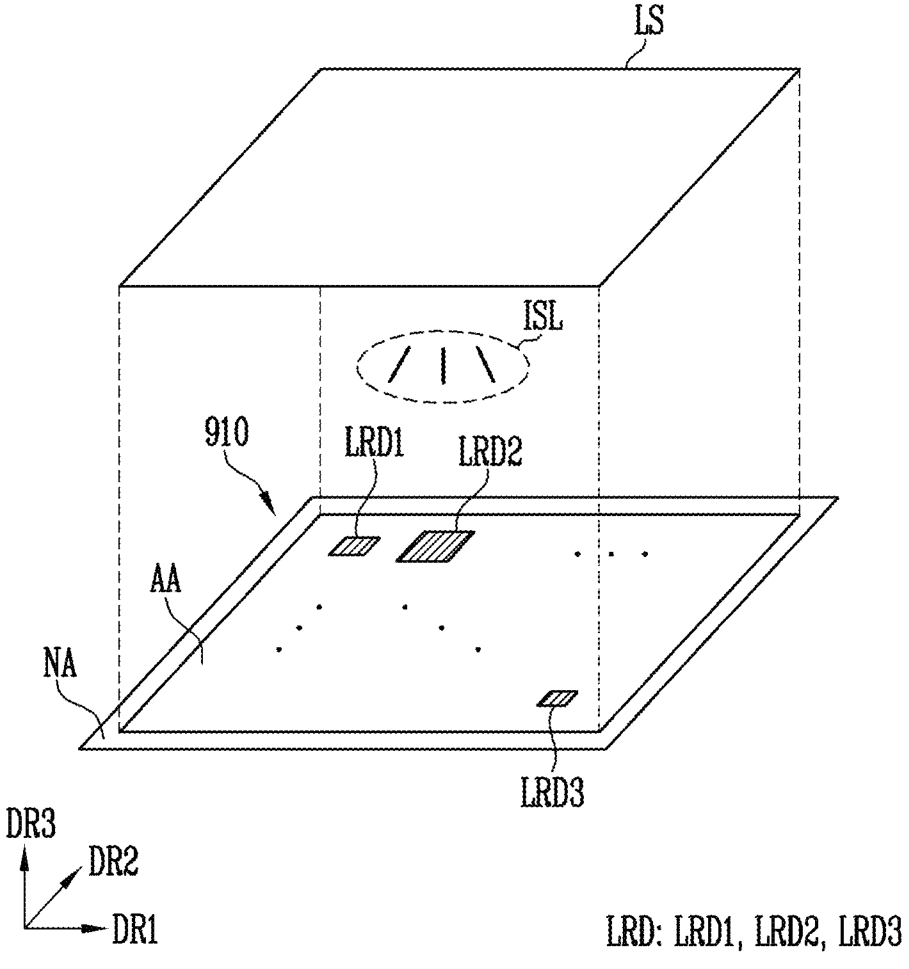
FIG. 9A is a drawing illustrating aspects of operations for inspecting a display panel according to some embodiments of the present disclosure.
Figure 9B:
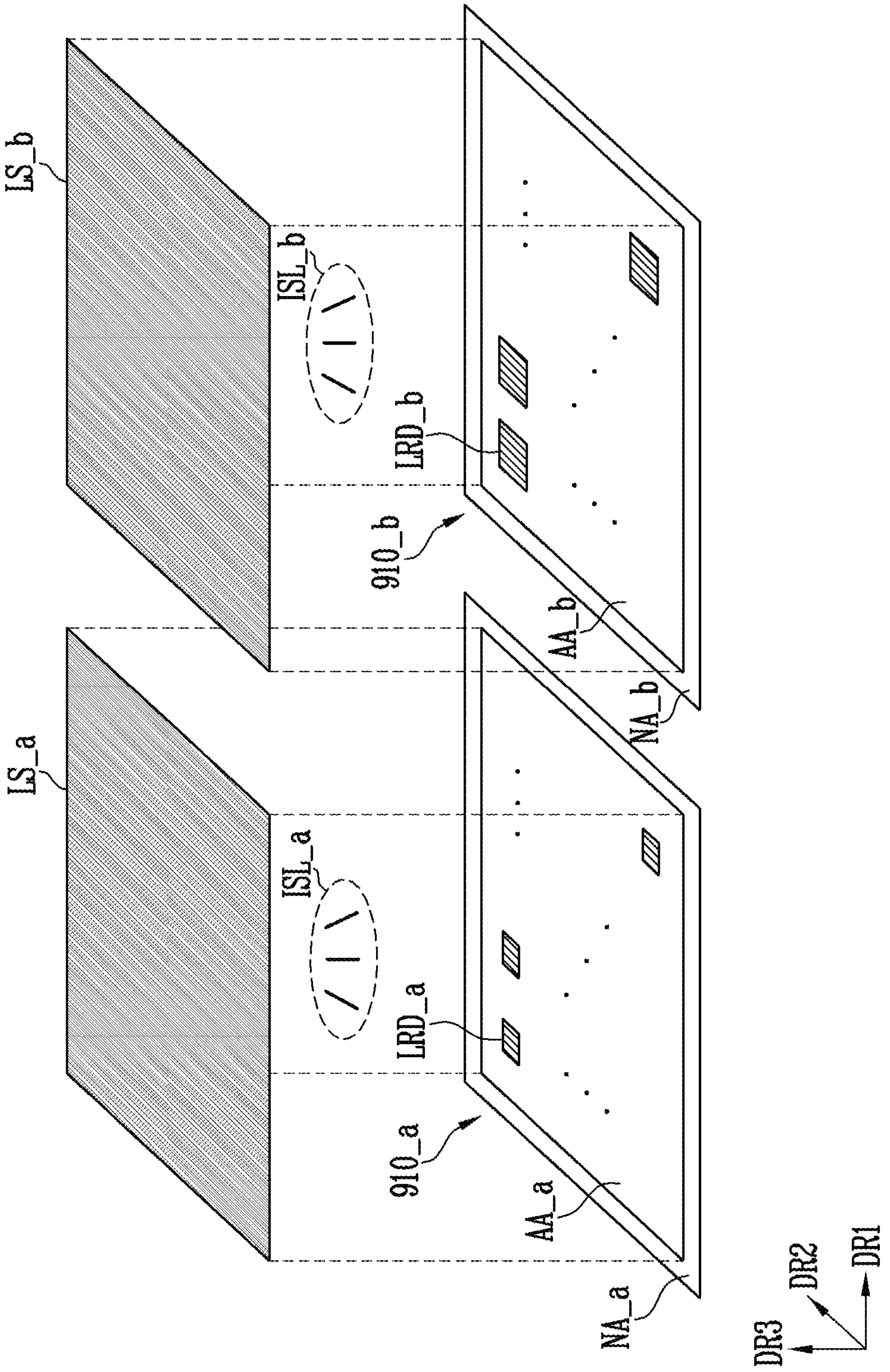
FIG. 9B is a drawing illustrating aspects of operations for inspecting a plurality of display panels according to some embodiments of the present disclosure.
Figures 10, 11:
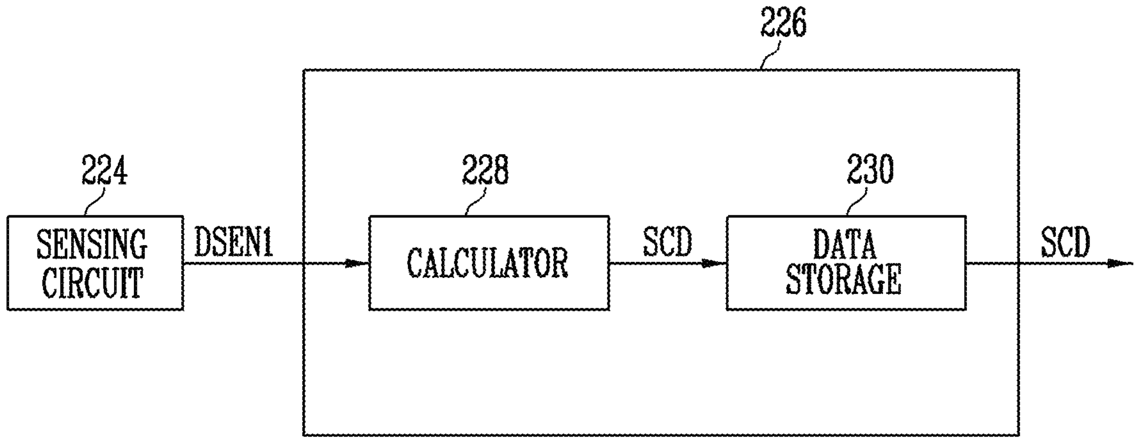
FIG. 10 is a block diagram schematically illustrating a calculation unit and a data storage unit of a compensating circuit.
FIG. 11 is a drawing illustrating a lookup table stored in the data storage unit.

FIG. 9A is a drawing illustrating aspects of operations for inspecting a display panel according to some embodiments of the present disclosure. FIG. 9B is a drawing illustrating aspects of operations for inspecting a plurality of display panels according to some embodiments of the present disclosure. FIG. 10 is a block diagram schematically illustrating a calculation unit and a data storage unit of a compensating circuit. FIG. 11 is a drawing illustrating a lookup table stored in the data storage unit.

Referring to FIGS. 2A, 5, and 8, a driving method of an electronic device may include the operation (S810) of sensing the sensing current of each of optical sensors. In the operation (S810) of sensing the sensing current of each of the optical sensors, the sensing circuit 224 may sense the sensing current SC of each of the optical sensors PHS.

Referring to FIG. 9A, the display panel 910 may include a display area AA and a non-display area NA surrounding the display area AA. The display panel 910 may include first to third light receiving elements LRD1 to LRD3 located on the display area AA. The first to third light receiving elements LRD1 to LRD3 of FIG. 9A may be described similarly to the first to third light receiving elements LRD1 to LRD3 of FIG. 7.

The light source unit LS may radiate inspection light ISL toward the display panel 910. For example, the light source unit LS may be composed of a planar light source. At this time, the light source unit LS may radiate inspection light ISL with a uniform amount of light per unit area on the display area AA of the display panel 910. That is, the intensity of the inspection light ISL incident on the upper surface (e.g., a surface facing the third direction DR3) of the display panel 910 may be uniform. However, the size (e.g., area on the display area AA) of each of the first to third light receiving elements LRD1 to LRD3 may be different. Accordingly, the amounts of light received by each of the first to third light receiving elements LRD1 to LRD3 for the inspection light ISL irradiated to the display panel 910 may be different from each other, and even if the same (or substantially the same) light may be emitted, the sensing currents SC of the optical sensors PHS including each of the first to third light receiving elements LRD1 to LRD3 may be different from each other.

The sensing circuit 224 (see FIG. 10) may sense the intensity of the sensing current SC of each of the optical sensors PHS different from each other. For example, the sensing circuit 224 (or the read-out circuit 350, see FIG. 3) may output a digital value corresponding to the intensity of the sensing current SC flowing through the sensing lines RX1 to RX0 (see FIG. 4) that are electrically connected to the first to third light receiving elements LRD1 to LRD3, respectively).

Referring to FIG. 9B, a plurality of display panels 910_*a* and 910_*b* may be inspected.

The first display panel 910_*a* may include a display area AA_a and a non-display area NA_a surrounding the display area AA_a. The first display panel 910_*a* may include fourth light receiving elements LRD_a located on the display area AA_a.

The second display panel 910_*b* may include a display area AA_b and a non-display area NA_b surrounding the display area AA_b. The second display panel 910_*b* may include fifth light receiving elements LRD_b located on the display area AA_b.

The first light source unit LS_a may irradiate the first inspection light ISL_a toward the first display panel 910_*a*. At this time, the intensity of the first inspection light ISL_a incident on the upper surface (e.g., the surface facing the third direction DR3) of the first display panel 910_*a* may be uniform. Additionally, the second light source unit LS_b may irradiate the second inspection light ISL_b toward the second display panel 910_*b*. At this time, the intensity of the second inspection light ISL_b incident on the upper surface (e.g., the surface facing the third direction DR3) of the second display panel 910_*b* may be uniform. At this time, the intensity of the first inspection light ISL_a and the intensity of the second inspection light ISL_b may be substantially the same. For example, the amount of light per unit area of the first inspection light ISL_a and the amount of light per unit area of the second inspection light ISL_b may be the same (or substantially the same).

Meanwhile, the size of any one of the fourth light receiving elements LRD_a and one of the fifth light receiving elements LRD_b may be different from each other. Accordingly, the amount of light received for the first light ISL1 of any one of the fourth light receiving elements LRD_a and the amount of light received for the second light ISL2 of any one of the fifth light receiving elements LRD_b may be different from each other. That is, the sensing current SC of the optical sensors PHS including the fourth light receiving elements LRD_a and the sensing current SC of the optical sensors PHS including the fifth light receiving elements LRD_b are may be different.

Each of the plurality of electronic devices 100 may include a sensing circuit 224. According to some embodiments of the present invention, the sensing circuit 224 of each of the plurality of electronic devices 100 may measure each of the intensity of the sensing current SC of the optical sensors PHS including the fourth light receiving elements LRD_a and the intensity of the sensing current SC of the optical sensors PHS including the fifth light receiving elements LRD_b.

Referring to FIGS. 2A, 3, and 8, the driving method of an electronic device may include the operation (S280) of generating input sensing data based on a result of sensing the sensing current of each of the optical sensors. In the operation (S820) of generating input sensing data based on the results of sensing the sensing current of each optical sensor, the sensing circuit 224 may convert the intensity of the sensing current SC measured in the operation (S810) into a digital value. For example, the sensing current SC of the plurality of optical sensors PHS may flow through the plurality of sensing lines RX1 to RXo. At this time, as described above, the sensing circuit 224 may sense each of the optical sensors PHS by integrating the sensing current SC flowing through the sensing lines RX1 to RXo. Thereafter, the sensing circuit 224 may convert a result of sensing the sensing current SC of each of the optical sensors PHS into input sensing data DSEN1.

Referring to FIGS. 8, 9A, and 10, the driving method of an electronic device includes the operation (S830) of receiving input sensing data and generating sensing correction data corresponding to each of the optical sensors based on the received input sensing data. In the operation (S830) of receiving input sensing data and generating sensing correction data corresponding to each of the optical sensors based on the received input sensing data, the compensating circuit 226 may generate sensing correction data SCD corresponding to each of the optical sensors PHS based on the input sensing data DSEN1 received from the sensing circuit 224.

Referring to FIG. 11 together, the compensating circuit 226 may include a calculation unit 228 and a data storage unit 230. The calculation unit 228 may generate sensing correction data SCD based on the intensity of the current flowing through each of the optical sensors PHS. For example, referring to FIG. 9A, the calculation unit 228 may generate first to third sensing correction data SCD1 to SCD3 corresponding to each of the first to third light receiving elements LRD1 to LRD3 included in each of the optical sensors PHS.

According to some embodiments, the calculation unit 228 may generate the first sensing correction data SCD1 and the second sensing correction data SCD2 based on a difference between the intensity of the first sensing current SC1 flowing through the first optical sensor including the first light receiving element LRD1 and the intensity of the second sensing current SC2 flowing through the second optical sensor including the second light receiving element LRD2. As shown in FIG. 9A, when the size of the first light receiving element LRD1 is smaller than the size of the second light receiving element LRD2, the first sensing current SC1 may be smaller than the second sensing current SC2. Accordingly, the calculation unit 228 may assign a weight based on the difference between the second sensing current SC2 and the first sensing current SC2 to the first sensing correction data SCD1. For example, the first sensing correction data SCD1 may be larger than the second sensing correction data SCD2 by the weight described above.

According to some embodiments, the calculation unit 228 may generate the first to third sensing correction data SCD1 to SCD3 by normalizing the sensing current SC3 flowing through the third optical sensor including the first sensing current SC1, the second sensing current SC2, and the third light receiving element LRD3. For example, when the ratio of the sizes of the first light receiving element LRD1, the second light receiving element LRD2, and the third light receiving element LRD3 is 10:9:11, the calculation unit 228 may generate values of the first sensing correction data SCD1, the second sensing correction data SCD2, and the third sensing correction data SCD3 to be about 1.0, 1.1, and 0.9, respectively.

The sensing correction data SCD may be inversely proportional to the size of the light receiving element LRD. The sensing correction data SCD may be inversely proportional to the intensity of sensing current SC. That is, the size of the light receiving element LRD may be proportional to the intensity of the sensing current SC and may be inversely proportional to the sensing correction data SCD. For example, when the ratio of the size of the first to third light receiving elements LRD1 to LRD3 is 10:9:11, the ratio of the intensity of the first to third sensing currents SC1 to SC3 may be 10:9:11, and the ratio of the first to third sensing correction data SCD1 to SCD3 may be 10:11:9.

In the operation (S830) of receiving input sensing data and generating sensing correction data corresponding to each of the optical sensors based on the received input sensing data, the calculation unit 228 may provide the sensing correction data SCD to the data storage unit 230. The data storage unit 230 may store sensing correction data SCD in the form of a lookup table 1100. For example, the data storage unit 230 may store the lookup table 1100 in which the first sensing correction data SCD1 is input so that it corresponds to the size of the first light receiving element LRD1 and the first sensing current SC1. Additionally, the data storage unit 230 may store the lookup table 1100 in which the second sensing correction data SCD2 is input so that it corresponds to the size of the second light receiving element LRD2 and the second sensing current SC2, and may store the lookup table 1100 in which the third sensing correction data SCD3 is input so that it corresponds to the size of the third light receiving element LRD3 and the third sensing current SC3.

Referring to FIGS. 2A, 9A, and 10, the driving method of an electronic device may include the operation (S840) of generating output sensing data based on the sensing correction data and the input sensing data. For example, the sensing circuit 224 may generate output sensing data DSEN2 based on the sensing correction data SCD and the input sensing data DSEN1, and may provide the corresponding output sensing data DSEN2 to the processor 130.

According to some embodiments of the present invention, the electronic device 100 can sense the optical sensors PHS of the display panel 210 with relatively improved reliability. For example, the sensing circuit 224 may generate the output sensing data DSEN2 based on the sensing correction data SCD. Accordingly, even if the sizes of the light receiving elements LRD of the display panel 210 are different, the amount of light received by the inspection light ISL incident on the optical sensors PHS of the display panel 210 can be accurately sensed.

Although specific embodiments and applications are described herein, other embodiments and variations may be derived from the above description. Accordingly, the spirit and scope of embodiments according to the present invention are not limited to these embodiments, but extends to the scope of the claims set forth below, and their equivalents.

What is claimed is:

1. A display device comprising:

a display panel including pixels each including a light emitting element and optical sensors each including a light receiving element;

a sensing circuit configured to sense the optical sensors; and a compensating circuit configured to store sensing correction data corresponding to a size of the light receiving element of each of the optical sensors, based on a result of sensing the optical sensors.

2. The display device of claim 1, wherein an intensity of current flowing through each of the optical sensors due to light incident on the display panel is different from each other.

3. The display device of claim 2, wherein the optical sensors include a first optical sensor and a second optical sensor different from the first optical sensor, and the compensating circuit includes a calculation unit configured to generate the sensing correction data based on an intensity of current flowing through the first optical sensor and the second optical sensor.

4. The display device of claim 3, wherein the compensating circuit includes a data storage unit configured to store the sensing correction data, and the sensing correction data is inversely proportional to the size of the light receiving element.

5. The display device of claim 4, wherein the display panel further includes a bank layer including a first opening in an area corresponding to the light receiving element of each of the optical sensors; and a black matrix layer on the bank layer and including a second opening in an area corresponding to the light receiving element of each of the optical sensors.

6. The display device of claim 5, wherein the size of the light receiving element is determined by a width of the first opening and the second opening.

7. The display device of claim 3, wherein the sensing correction data is generated based on a difference between an intensity of current flowing in the first optical sensor and an intensity of current flowing in the second optical sensor.

8. The display device of claim 3, wherein the optical sensors further include a third optical sensor, and the sensing correction data is generated by normalizing an intensity of current flowing through each of the first optical sensor, the second optical sensor, and the third optical sensor.

9. An electronic device comprising:

a display device including a display panel including optical sensors and a sensing circuit configured to sense the optical sensors;

a compensating circuit configured to generate sensing correction data based on a result of sensing the optical sensors; and a processor configured to receive the sensing correction data from the compensating circuit and to provide image data generated based on the sensing correction data to the display device, wherein each of the optical sensors includes a light receiving element, and the sensing correction data corresponds to a size of the light receiving element.

10. The electronic device of claim 9, wherein an intensity of current flowing through each of the optical sensors due to light incident on the display panel is different from each other.

11. The electronic device of claim 10, wherein the compensating circuit includes a calculation unit configured to generate the sensing correction data based on an intensity of the current flowing through each of the optical sensors.

12. The electronic device of claim 11, wherein the processor includes a data storage unit configured to store the sensing correction data, and the sensing correction data is inversely proportional to the size of the light receiving element.

13. A driving method of an electronic device comprising:

sensing sensing currents of optical sensors on a display panel using a sensing circuit;

generating input sensing data based on a result of sensing the sensing currents of the optical sensors using the sensing circuit;

receiving the input sensing data and generating sensing correction data corresponding to each of the optical sensors based on the received input sensing data using a compensating circuit; and generating output sensing data based on the sensing correction data and the input sensing data using a processor, wherein the optical sensors include a first optical sensor and a second optical sensor different from the first optical sensor, and the input sensing data is proportional to an intensity of the sensing current flowing through the first optical sensor and the second optical sensor.

14. The driving method of claim 13, further comprising:

generating, by the compensating circuit, the sensing correction data based on a difference between the intensity of the sensing current of the first optical sensor and the sensing current of the second optical sensor.

15. The driving method of claim 13, wherein the optical sensors further include a third optical sensor, and the sensing correction data is generated by normalizing the input sensing data of the first optical sensor, the second optical sensor, and the third optical sensor.

16. The driving method of claim 13, further comprising:

storing the sensing correction data corresponding to each of the first optical sensor and the second optical sensor, wherein the output sensing data is generated by reflecting the sensing correction data stored in the intensity of current flowing through the first optical sensor and the second optical sensor.

* * * * *